US008824239B2

(12) United States Patent
Welker et al.

(10) Patent No.: US 8,824,239 B2
(45) Date of Patent: Sep. 2, 2014

(54) MARINE SEISMIC SURVEY METHOD AND SYSTEM

(75) Inventors: Ken Welker, Nesoya (NO); Peter Tyler, Canterbury (GB)

(73) Assignee: WesternGeco L.L.C., Houston, TX (US)

( * ) Notice: Subject to any disclaimer, the term of this patent is extended or adjusted under 35 U.S.C. 154(b) by 934 days.

(21) Appl. No.: 10/598,732

(22) PCT Filed: Mar. 17, 2004

(86) PCT No.: PCT/US2004/008029
§ 371 (c)(1),
(2), (4) Date: Sep. 8, 2006

(87) PCT Pub. No.: WO2005/096018
PCT Pub. Date: Oct. 13, 2005

(65) Prior Publication Data
US 2009/0141587 A1    Jun. 4, 2009

(51) Int. Cl.
*G01V 1/38* (2006.01)
(52) U.S. Cl.
CPC .................................. *G01V 1/3826* (2013.01)
USPC .................................. 367/16; 367/15; 367/17
(58) Field of Classification Search
USPC .......................................... 367/15–17, 19–22
See application file for complete search history.

(56) References Cited

U.S. PATENT DOCUMENTS

| 3,412,704 | A |   | 11/1968 | Buller et al. |
| 3,479,638 | A |   | 11/1969 | Rusnak |
| 3,730,483 | A |   | 5/1973  | Newell |
| 3,921,124 | A |   | 11/1975 | Payton |
| 3,953,826 | A |   | 4/1976  | Brundrit et al. |
| 4,027,616 | A |   | 6/1977  | Guenther et al. |
| 4,033,278 | A |   | 7/1977  | Waters |
| 4,063,213 | A | * | 12/1977 | Itria et al. ........................ 367/17 |

(Continued)

FOREIGN PATENT DOCUMENTS

| EP | 0 018 053 A1 | 10/1980 |
| EP | 0 018 053 B1 | 10/1980 |

(Continued)

OTHER PUBLICATIONS

Gikas et al, "Reliability analysis in dynamic systems: Implications for positioning marine seismic networks", Geophysics, vol. 64, Nov. 4, Jul.-Aug. 1999, pp. 1014-1022.*

(Continued)

*Primary Examiner* — Isam Alsomiri
*Assistant Examiner* — James Hulka

(57) ABSTRACT

An inventive method provides for control of a seismic survey spread while conducting a seismic survey, the spread having a vessel, a plurality of spread control elements, a plurality of navigation nodes, and a plurality of sources and receivers. The method includes the step of collecting input data, including navigation data for the navigation nodes, operating states from sensors associated with the spread control elements, environmental data for the survey, and survey design data. The positions of the sources and receivers are estimated using the navigation data, the operating states, and the environmental data. Optimum tracks for the sources and receivers are determined using the position estimates and a portion of the input data that includes at least the survey design data. Drive commands are calculated for at least two of the spread control elements using the determined optimum tracks. The inventive method is complemented by an inventive system.

11 Claims, 9 Drawing Sheets

(56) References Cited

U.S. PATENT DOCUMENTS

| | | | |
|---|---|---|---|
| 4,087,780 A | 5/1978 | Itria et al. | |
| 4,110,726 A | 8/1978 | Dorrance et al. | |
| 4,134,098 A | 1/1979 | Ruehle | |
| 4,323,989 A | 4/1982 | Huckabee et al. | |
| 4,404,664 A * | 9/1983 | Zachariadis | 367/19 |
| 4,506,352 A | 3/1985 | Brandsaeter et al. | |
| 4,693,336 A | 9/1987 | Newman | |
| 4,716,553 A | 12/1987 | Dragsund et al. | |
| 4,719,987 A | 1/1988 | George, Jr. et al. | |
| 4,727,956 A | 3/1988 | Huizer | |
| 4,729,333 A | 3/1988 | Kirby et al. | |
| 4,748,599 A | 5/1988 | Gjestrum et al. | |
| 4,757,482 A | 7/1988 | Fiske, Jr. | |
| 4,798,156 A | 1/1989 | Langeland et al. | |
| 4,845,686 A | 7/1989 | Brac | |
| 4,862,422 A | 8/1989 | Brac | |
| 4,862,425 A * | 8/1989 | Cretin et al. | 367/33 |
| 4,868,793 A | 9/1989 | Dunbar | |
| 4,890,568 A | 1/1990 | Dolengowski | |
| 4,960,183 A | 10/1990 | Young, II | |
| 4,974,212 A | 11/1990 | Sheiman | |
| 4,992,990 A | 2/1991 | Langeland et al. | |
| 5,052,814 A | 10/1991 | Stubblefield | |
| 5,113,377 A | 5/1992 | Johnson | |
| 5,142,498 A | 8/1992 | Duren | |
| 5,144,588 A | 9/1992 | Johnston et al. | |
| 5,184,329 A | 2/1993 | Regnault et al. | |
| 5,281,773 A * | 1/1994 | Duren | 181/111 |
| 5,353,223 A | 10/1994 | Norton et al. | |
| 5,357,892 A | 10/1994 | Vatne et al. | |
| 5,448,233 A * | 9/1995 | Saban et al. | 340/963 |
| 5,523,951 A | 6/1996 | Kriesgman et al. | |
| 5,532,975 A | 7/1996 | Elholm | |
| 5,619,474 A | 4/1997 | Kuche | |
| 5,668,775 A | 9/1997 | Hatteland | |
| 5,771,202 A | 6/1998 | Bale et al. | |
| 5,784,335 A | 7/1998 | Deplante et al. | |
| 5,790,472 A | 8/1998 | Workman et al. | |
| 5,920,828 A | 7/1999 | Norris et al. | |
| 5,924,049 A | 7/1999 | Beasley et al. | |
| 5,995,452 A | 11/1999 | Bouyoucus | |
| 6,005,828 A | 12/1999 | Carroll et al. | |
| 6,011,752 A | 1/2000 | Ambs et al. | |
| 6,011,753 A | 1/2000 | Chien | |
| 6,028,817 A | 2/2000 | Ambs | |
| 6,031,789 A | 2/2000 | Broussard et al. | |
| 6,041,018 A | 3/2000 | Roche | |
| 6,088,298 A * | 7/2000 | Onat | 367/138 |
| 6,091,670 A | 7/2000 | Oliver et al. | |
| 6,216,627 B1 | 4/2001 | Johnsen et al. | |
| 6,256,589 B1 | 7/2001 | Gallotti Guimaraes | |
| 6,285,956 B1 | 9/2001 | Bennett et al. | |
| 6,292,436 B1 * | 9/2001 | Rau et al. | 367/149 |
| 6,418,378 B1 | 7/2002 | Nyland | |
| 6,459,653 B1 | 10/2002 | Kuche | |
| 6,474,254 B1 | 11/2002 | Ambs et al. | |
| 6,477,111 B1 | 11/2002 | Lunde et al. | |
| 6,504,792 B2 | 1/2003 | Barker | |
| 6,510,390 B1 | 1/2003 | Bunting et al. | |
| 6,525,992 B1 | 2/2003 | Olivier et al. | |
| 6,590,831 B1 * | 7/2003 | Bennett et al. | 367/16 |
| 6,606,958 B1 * | 8/2003 | Bouyoucos | 114/242 |
| 6,618,321 B2 * | 9/2003 | Brunet | 367/19 |
| 6,629,037 B1 | 9/2003 | Nyland | |
| 6,655,311 B1 * | 12/2003 | Martin et al. | 114/242 |
| 6,671,223 B2 | 12/2003 | Bittleston | |
| 6,681,710 B2 * | 1/2004 | Semb | 114/244 |
| 6,691,038 B2 * | 2/2004 | Zajac | 702/14 |
| 6,839,302 B2 | 1/2005 | Austad et al. | |
| 6,873,571 B2 * | 3/2005 | Clayton et al. | 367/144 |
| 6,932,017 B1 | 8/2005 | Hillesund et al. | |
| 7,047,898 B2 * | 5/2006 | Petersen et al. | 114/244 |
| 7,156,035 B2 * | 1/2007 | Hocquet et al. | 114/244 |
| 7,446,706 B2 * | 11/2008 | Riley et al. | 342/450 |
| 2002/0126575 A1 | 9/2002 | Bittleston | |
| 2002/0174817 A1 | 11/2002 | Semb | |
| 2003/0039170 A1 | 2/2003 | Soreau et al. | |
| 2003/0151974 A1 | 8/2003 | Kutty et al. | |
| 2003/0168277 A1 | 9/2003 | Hopperstad et al. | |
| 2003/0208320 A1 | 11/2003 | Zajac | |
| 2003/0220745 A1 | 11/2003 | Campbell | |
| 2004/0022125 A1 | 2/2004 | Clayton et al. | |
| 2004/0060498 A1 | 4/2004 | Petersen et al. | |
| 2004/0136266 A1 | 7/2004 | Howlid et al. | |
| 2004/0196737 A1 | 10/2004 | Nicholson | |
| 2005/0180263 A1 * | 8/2005 | Lambert et al. | 367/128 |
| 2005/0219948 A1 | 10/2005 | Naess | |
| 2007/0019504 A1 | 1/2007 | Howlid et al. | |
| 2008/0279042 A1 | 11/2008 | Storteig et al. | |
| 2009/0175124 A1 | 7/2009 | Sorli | |
| 2011/0286302 A1 | 11/2011 | Welker et al. | |

FOREIGN PATENT DOCUMENTS

| | | |
|---|---|---|
| EP | 0243146 | 10/1987 |
| EP | 0 168 959 B1 | 8/1988 |
| EP | 0 319 716 B1 | 6/1989 |
| EP | 0 321 705 B1 | 6/1989 |
| EP | 0 525 391 B1 | 2/1993 |
| EP | 0 613 025 A1 | 8/1994 |
| EP | 2280294 | 2/2011 |
| FR | 2574560 A1 | 6/1986 |
| GB | 2320706 A | 7/1998 |
| GB | 2 364 388 A | 1/2002 |
| GB | 2390589 A | 1/2004 |
| GB | 2399883 | 9/2004 |
| GB | 2400662 A | 10/2004 |
| GB | 2 412 965 A | 10/2005 |
| GB | 2414804 A | 12/2005 |
| WO | 9915913 | 4/1999 |
| WO | 9960421 | 11/1999 |
| WO | 00-20892 A1 | 4/2000 |
| WO | 00-20895 A1 | 4/2000 |
| WO | WO0020895 * | 4/2000 |
| WO | 0067046 A1 | 11/2000 |
| WO | 01-16623 A1 | 3/2001 |
| WO | 0133256 A1 | 5/2001 |
| WO | 01-61380 A2 | 8/2001 |
| WO | WO 01/55747 A1 | 8/2001 |
| WO | 01-84186 A1 | 11/2001 |
| WO | 0184184 | 11/2001 |
| WO | 02-47968 A1 | 6/2002 |
| WO | WO 02/059650 A1 | 8/2002 |
| WO | 02-103393 A2 | 12/2002 |
| WO | 2004-092771 A2 | 10/2004 |
| WO | WO 2005/096015 A1 | 10/2005 |
| WO | WO 2005/096018 A1 | 10/2005 |

OTHER PUBLICATIONS

Armstrong et al., "The best parameter subset using the Chebychev curve fitting criterion", Mathematical Programming, vol. 27, No. 1, Sep. 1983.*

Gikas et al., "Reliability Analysis in dynamic systems: Implications for positioning marine seismic networks", Geophysics, vol. 64, No. 4, Jul.-Aug. 1999, pp. 1014-1022.*

Armstrong et al., "The Best parameter subset using the Chebychev curve fitting criterion", Mathematical Programming, vol. 27, No. 1, Sep. 1983, pp. 64-74.*

Gikas et al, "Reliability analysis in dynamic systems: Implications for positioning marine seismic networks", Geophysics, vol. 64 No. 4, Jul.-Aug. 1999, pp. 1014-1022.*

Armstrong et al. "The best parameter subset using the Chebychev curve fiting criterion", Mathematical Programming, vol. 27, No. 1, Sep. 1983, pp. 64-74.*

Armstrong et al., "The best parameter subset using Chenychev curve fitting criterion", Mathematical Programming, vol. 27, No. 1, Sep. 1983, pp. 64-74.*

Armstrong et al, "The best parameter subset using the Chebychev curve fitting criterion", Mathematical Programming, vol. 27, No. 1, Sep. 1983, pp. 64-74.*

(56) References Cited

OTHER PUBLICATIONS

Gikas et al, "Reliability analysis in dynamic systems: Implications for positioning marine seismic networks", Geophysics, vol. 64, No. 4, Jul.-Aug. 1999, pp. 1014-1022.*

Armstrong et al., "The best parameter subset using Chebychev curve fitting criterion", Mathematical Programming, vol. 27, No. 1, Sep. 1983, pp. 64-74.*

Schmidt, "Solution for seismic source registration," Worldoil.com, 226(9):1-3, Sep. 2005.

Response to Office Action (Jun. 3, 2010) and Office Action (Mar. 3, 2010); U.S. Appl. No. 12/267,316 (US 2009-0175124 A1—Sorli).

Response to Office Action (Jul. 14, 2010) and Office Action (Apr. 15, 2010); U.S. Appl. No. 12/175,939 (US 2008-0279042 A1—Storteig, et al).

RCE Amendment (Sep. 15, 2010) and Ex Parte Quayle Office Action (Sep. 15, 2010); U.S. Appl. No. 10/552,795 (US 2007-0019504 A1—Howlid, et al.).

Ashton et al.; "3D Seismic Surveys"; Oilfield Review; Apr. 1994.

UK Search Report for GB 0511248.7; Sep. 8, 2005.

Christie; "Raising the Standards of Seismic Data Quality" Oilfield Review; Summer 2001.

"Western and Geco Merge, Streamers that can be steered"; WorldOil.com; 221(7); Jul. 2000.

Karlsson et al., "Multivessel surveying reduces seismic cost, acquisition time," Offshore, Mar. 1991, vol. 51(3): pp. 34-37.

Extended European Search Report of European Application No. 10184935.4 dated Dec. 22, 2011.

Examination Report of Indian Patent Application No. 3366/CHENP/2006 dated Nov. 23, 2012: pp. 1-2.

Ablow et al., "Numerical Simulation of Undersea Cable Dynamics," Ocean Engng., 1983, vol. 10(6): pp. 443-457.

Dowling, "The dynamics of towed flexible cylinders Part 1. Neutrally buoyant elements," J. Fluid Mech., 1988, vol. 187: pp. 507-532.

Dowling, "The dynamics of towed flexible cylinders Part 2. Negatively buoyant elements," J. Fluid Mech., 1988, vol. 187: pp. 533-571.

Krail et al., "The shape of a marine streamer in a cross current," Geophysics, Mar. 1989, vol. 54(3): pp. 302-308.

* cited by examiner

MARINE SEISMIC SURVEY METHOD AND SYSTEM

BACKGROUND OF THE INVENTION

1. Field of the Invention

The present invention relates generally to the performance of a marine seismic acquisition survey, and, more particularly, to the control of the seismic survey spread during the survey.

2. Background of the Related Art

The performance of a marine seismic acquisition survey typically involves one or more vessels towing at least one seismic streamer through a body of water believed to overlie one or more hydrocarbon-bearing formations. In order to perform a 3-D marine seismic acquisition survey, an array of marine seismic streamers, each typically several thousand meters long and containing a large number of hydrophones and associated electronic equipment distributed along its length, is towed at about 5 knots behind a seismic survey vessel. The vessel also tows one or more seismic sources suitable for use in water, typically air guns. Acoustic signals, or "shots," produced by the seismic sources are directed down through the water into the earth beneath, where they are reflected from the various strata. The reflected signals are received by the hydrophones carried in the streamers, digitized, and then transmitted to the seismic survey vessel where the digitized signals are recorded and at least partially processed with the ultimate aim of building up a representation of the earth strata in the area being surveyed.

Often two or more sets of seismic data signals are obtained from the same subsurface area. These sets of seismic data signals may be obtained, for instance, by conducting two or more seismic surveys over the same subsurface area at different times, typically with time lapses between the seismic surveys varying between a few months and a few years. In some cases, the seismic data signals will be acquired to monitor changes in subsurface reservoirs caused by the production of hydrocarbons. The acquisition and processing of time-lapsed three dimensional seismic data signals over a particular subsurface area (commonly referred to in the industry as "4-D" seismic data) has emerged in recent years as an important new seismic prospecting methodology.

It is common practice for a certain amount of information about the survey area to be gathered beforehand so that the appropriate equipment and methods can be selected (known as the "survey design") to achieve the desired geophysical and operational objectives. Some of this information is used to provide the basic parameters for the survey, such as the boundaries of the survey area, the lengths of the towed streamer cables, and the firing of the seismic sources. Such information has, to some extent, been used to assist in survey control through various independent systems. Typical of such control systems have been vessel autopilots, ship heading control, and towed cable positioning and depth adjustment. For example, U.S. Pat. No. 6,629,037 describes the use of cost maps to optimize paths for seismic in-fill shooting within a known survey area. British Patent Application No. GB 2,364, 388 discloses the positioning of seismic sources and streamers within a known survey area according to recorded position data from a prior survey.

It is also well known for a certain amount of information about the survey execution to be gathered during the survey (i.e., in real time or near-real time) so that the appropriate settings and positions can be achieved according to the desired geophysical and operational objectives. Such information has, to some extent, also been used to provide survey control through various independent systems. The state of the art in such control systems is represented by the following patent references: U.S. Pat. No. 6,618,321 (simulation of streamer positioning during a survey according to current determination); U.S. Pat. No. 6,590,831 (coordination of multiple seismic acquisition vessels during a survey according to monitored survey parameters); U.S. Pat. No. 6,418,378 (neural network trained by survey-acquired data for predicting seismic streamer shape during a subsequent survey);U.S. Pat. No. 5,790,472 (positioning of seismic streamers during a survey according to hydrophone noise levels); and International Patent Application No. WO 00/20895 (seismic streamer positioning during a survey according to estimated velocity of streamer positioning devices).

The control systems described above rely upon particular inputs (e.g., marine current) to determine information (e.g., passive streamer shape) useful in controlling a seismic survey towing vessel. None of these systems, however, relies upon or takes into account a broad spectrum of input conditions and parameters that includes the various objectives and constraints of the seismic survey equipment and methods. Furthermore, none of these systems seeks to actively control the spread with a coordinated suite of steering devices deployed throughout the spread. A need therefore exists for such a comprehensive system.

The control systems mentioned above have been designed to achieve desired results by providing outputs, such as commands or paths, for immediate implementation. There has been little or no consideration in such optimization of the important time-delayed effects of these outputs. A need therefore exists for a seismic survey control system that accounts for time-delayed effects of outputs—particularly control commands—as well as the immediate effects.

DEFINITIONS

Certain terms are defined throughout this description as they are first used, while certain other terms used in this description are defined below:

"Angle of Attack" is the angle of a wing or deflector relative to the fluid (i.e., water) flow direction. The angle of attack is a derived quantity, computed from the orientation of the deflector or the body to which the wing is attached in the system reference frame, the controllable or fixed orientation of the wing relative to the deflector/body, and the direction of the current in the system reference frame. When the wing/deflector has no lift, it has zero angle of attack.

"Area rotation" means an axis rotation from the north orientated axis. Thus, e.g., a 0° area rotation means the shooting direction, or direction of tow, is north. This gives the area-relative axes' orientation and determines the shooting directions for the survey.

"Base survey" means the original survey, and associated spread coordinates, that a time-lapse survey is trying to repeat.

"Course made good" means the actual track made with respect to the seabed.

"Cross-line" and "inline" mean perpendicular and parallel (respectively) to a direction of tow, and are defined in an area-relative reference frame. The reference frame origin may be translated to the vessel. An example of the inline axis orientation is parallel to the pre-survey designated shooting direction, (e.g., pre-plot line direction or area rotation).

"Drive commands" means changes in the spread control element operating states that will give a desired outcome in the positions of the spread.

"Force model" means a computer-implemented representation of the impact of a significant set of hydrodynamic forces on the spread. The force model includes representations of the spread and the medium (i.e., the sea and atmosphere) in which it functions. This medium includes vertical region from less than 40 meters below the sea surface and some 10's of meters above the air/sea interface. Forces generated outside this defined zone but that have resultants in this zone are also candidates for modeling.

"Natural Feather" means the angle between a line defined by any two points on a towed body and a reference direction, commonly the vessel shooting direction, where the points get their position due to the effect of current, wind or both. An example is the angle between the straight line formed by connecting the front and tail of a streamer cable and a pre-plot line direction.

"Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after they are received by the next process in the decision line.

"Position history" means coordinate or shape estimates at discrete times for any spread element or group of elements making up a spread component (e.g., a streamer or source array). Two coordinate or shape estimates made at discrete times gives an average velocity over the time difference. Three coordinate or shape estimates at three, different times gives two average velocities, and one average acceleration.

"PID" or "PID Controller" means a Proportional-Integral-Derivative controller, a type of feedback Controller whose output, a control variable (CV), is generally based on the error between some user-defined set point (SP) and some measured process variable (PV).

"Predicted residual" means the difference between spread model position coordinate predictions and independently determined, navigation-based position coordinates. This term is borrowed from Kalman filter estimation theory.

"Present survey" means raw data collection, computation results or actions that have been generated in the course of the survey presently undertaken. These may be used in real-time, near-real-time or as otherwise required.

"Prior survey history" means any data that is used in the preparation for, or execution of, the present survey, which was generated before the present survey began. Examples include a base survey, maritime charts, tidal information, depth information, seismic maps, borehole data, binning data, and historical records of natural feather. Such information may or may not be in the public domain. This data may be obtained during a preliminary survey.

"Real-time" means dataflow that occurs without any delay added beyond the minimum required for generation of the dataflow components. It implies that there is no major gap between the storage of information in the dataflow and the retrieval of that information. There is preferably a further requirement that the dataflow components are generated sufficiently rapidly to allow control decisions using them to be made sufficiently early to be effective.

"Shot points" means the unit of time corresponding to the temporal separation between seismic data acquisition events.

"Shot point target coordinates" means the intended two-dimensional coordinates for all spread objects to occupy in order to collect seismic data. This set of coordinates can be used to derive a spread body target shape as well.

"Spread" means the total number of "spread components," i.e., vessels, vehicles, and towed objects including cables, that are used together to conduct a marine seismic acquisition survey.

"Spread body shape" is a mathematical function describing the shape of any of the towed spread components. As an example, a streamer cable may be assumed to have a straight line shape from end to end. Alternatively, the shape may be a series of lines or higher order polynomials, connected between an arbitrary set of position coordinate estimates along the streamer, to give an approximation of the shape of the total streamer. A similar method can be applied to the seismic source array.

"Spread control element" means a spread component that is controllable and is capable of causing a spread component to change coordinates, either cross-line or inline.

"Spread control element operating states" means measurements giving information relevant to a spread model (such as a hydrodynamic force model). Examples include winged body orientation, water flow rates over deflectors, wing angles relative to a wing housing body, rudder angle, propeller speed, propeller pitch, tow cable tensions, etc.

"Spread control element performance specifications" or "performance specifications" means the performance limits of the spread control elements, both the individual elements and the system resulting from the combination of all the spread control elements. Examples include the range of wing angle values possible for a winged control element, the tension limits for a towing cable, the stall angle of a deflector device, etc.

"Spread front end" means the line (best fit or actual) formed by connecting the front end of the streamers, more or less perpendicular to the course made good of the vessel.

"Spread model" or "model of the spread" means code that is readable and executable by a computer for simulating the response of the spread to various input forces and conditions. A spread model may be a hydrodynamic force model, a neural network system, a closed loop control system (see, e.g., International Patent Application No. WO 00/20895), a motion model driven and calibrated by an L-Norm best-fit criteria, or a Kalman filter.

"Steerable front-end deflectors" (a.k.a. SFEDs) means steerable deflectors positioned at the front end of the outer most streamers, such as WesternGeco's MONOWING™ devices.

"Steered feather" is similar to natural feather, but with the angle is altered by steering devices.

"Steering devices" means devices for steering at least one of the spread components. Such devices include streamer steering devices, steerable front-end deflectors, and steerable buoys.

"Streamer steering devices" (a.k.a. SSDs) means steering devices distributed along the streamers, such as WesternGeco's Q-FIN™ devices.

"Tow points" are the points of origin on a towing vessel for the towed spread objects (e.g., points where lead-in cables exit the block on the back deck).

"Track" means the pre-designated two-dimensional coordinates for a spread component to occupy while conducting a portion of a seismic survey, such as a seismic survey line. Examples include a pre-plot line or a non-straight pre-survey set of coordinates.

"Trajectory" means the realized or actual set of coordinates that any spread component occupies during the survey.

"Translate" means an origin shift in x and y coordinates that gives a new origin for navigation purposes.

"Transform function" means a series of computations taking place in a computer that has various measured or projected quantities as input, and a set of drive commands that are designed to give a computed and desired change in positions of any number of objects as output.

SUMMARY OF THE INVENTION

In one aspect, the present invention provides a method for controlling a seismic survey spread while conducting a seismic survey, the spread having a vessel, a plurality of spread control elements, a plurality of navigation nodes, and a plurality of sources and receivers. The method includes the step of collecting input data, including navigation data for the navigation nodes, operating states from sensors associated with the spread control elements, environmental data for the survey, and survey design data. The positions of the sources and receivers are estimated using the navigation data, the operating states, and the environmental data. Optimum tracks for the sources and receivers are determined using the position estimates and a portion of the input data that includes at least the survey design data. Drive commands are calculated for at least two of the spread control elements using at least the determined optimum tracks.

The estimating, determining, and calculating steps of the inventive method may be executed by a transform function. More particularly, the positions may be estimated according to a spread model within the transform function. In one embodiment, the spread model calculates a first set of estimated positions using input that includes at least the operating states and the environmental data. The collected navigation data includes a second set of estimated positions. The first and second sets of estimated positions are combined within the transform function to produce the estimated source and receiver positions and predicted residuals. The predicted residuals are used to estimate a set of parameters that characterize the spread model. The spread model parameters are used to calibrate the spread model. The predicted residuals may further be used to estimate error states for sensors used to collect the environmental data.

The optimum tracks may be determined according to a weighting function within the transform function. In one embodiment, the weighting function receives as inputs the survey design data and the estimated positions of the sources and receivers. The input from the survey design data may include performance specifications for the spread control elements, such as steering constraints. In this embodiment, the weighting function is used to apply relative weighting coefficients to the inputs for calculation of optimum tracks for the spread by the transform function.

In a particular embodiment of the inventive method, the spread model is a hydrodynamic force model of the spread components. The force model may be based upon marine current data, among other things. In other embodiments, the spread model is a pure stochastic model of the spread components, is a neural network, or employs one of the L-norm fitting criteria. All these embodiments have in common the ability to parameterize control of the spread learned from a history of behavior based on all inputs, and an ability to generate drive commands that will realize an optimum set of spatial targets, either in the form of coordinates (e.g., shot point targets) or shape (e.g. steered feather), for the spread in the future.

In a particular embodiment, the spread response times are estimated and taken into account when calculating the drive commands. In this embodiment, the drive commands are also regulated to maintain stability of the spread and validated before being delivered to the spread control elements. Drive commands—particularly those used to control the vessel—can be implemented manually or automatically. Since most drive commands will have a slow response time, the implementer will be a human operator in some instances. Other drive commands, such as SSD wing angle changes, will preferably be controlled automatically, as is described in International Patent Application No. WO 00/20895.

The drive commands may be validated according geophysical and operational requirements. The geophysical requirements include achieving desired coverage of a subsurface area, duplicating the seismic signal ray paths of a prior survey, and controlling the seismic sensor noise. The operational requirements include defining one or more safe passages for the spread through dangerous areas, determining an optimum time to perform one or more lines of the survey, and reducing non-productive time. Accordingly, alternative drive commands may be calculated for effecting a safe passage between two or more definable locations Once validated, the drive commands are delivered to the spread control elements for attaining desired survey objectives. The drive commands may include commands for controlling at least one of the vessel propeller, vessel thruster, spread component steering devices, and the vessel cable winches.

Each of the drive commands is preferably used to control at least one of the position, speed, and heading for one or more components of the spread. The spread components typically include one or more marine vessels, and a plurality of components towed by at least one of the vessels. The towed components typically include cables, sources, sensors such as hydrophones, and steering devices such as steerable front-end deflectors (SFEDs) and streamer steering devices (SSDs). The spread components may further include one or more vehicles not tethered to the one or more vessels, such as an autonomous underwater vehicle (AUV) or an autonomous surface vehicle (ASV).

The spread control elements include at least two of a rudder, a propeller, a thruster, one or more devices for steering towed cables and instruments, and one or more steerable flotation devices. The sensors associated with the spread control elements for producing operating states collected among the input data include one or more sensor types of tension, water flow rate, inclination, orientation, acceleration, velocity, and position.

The environmental data collected among the input data include one or more data types of current, salinity, temperature, pressure, speed of sound, wave height, wave frequency, wind speed, and wind direction.

The survey design data collected among the input data includes one or more data types of area, depth, area rotation or shooting orientation, line coordinates, source and receiver positions, required coverage, local constraints, optimizing factors, and historical data. The survey design data further includes performance specifications for the spread control elements, such as drag and maneuvering characteristics for the vessel, steerable cable devices, steerable source devices and deflectors, drag characteristics for the towed cables, sources, and flotation devices, and winch operating characteristics. The survey design data may also be characterized by the spread tracks, performance specifications, and survey objectives.

The set of collected input data may also be characterized as including one or more data types of pre-survey, operator input, present survey, near real-time or real-time survey, and simulated survey.

The pre-survey data may include environmental sensor data and historical survey data.

The operator input data may include spread parameter settings and environmental data.

The real-time survey data may include one or more data types of cable tension, water flow rate, inclination, orientation, acceleration, velocity, positioning, spread control element setting, environmental data, seismic signal and noise data, and operator input. The collected positioning data may include data from one or more sensors of the group consisting of GPS receivers, echo sounders, depth sensors, acoustic ranging systems, magnetic compasses, gyro compasses, radio-location systems, accelerometers, and inertial systems. The spread control element setting data may include one or more inputs of the group consisting of thruster setting, propeller pitch, propeller rotation speed, rudder angle, towing cable tension, winch position, deflector orientation, deflector angle of attack, deflector water speed, streamer steering device orientation, and streamer steering device wing angle of attack.

The simulated survey data may include one or more data types of simulated pre-survey, simulated operator input, simulated present survey, simulated near real-time, simulated real-time survey, and simulated environmental data.

The raw seismic sensor data collected during the seismic survey may also be characterized as input data. Accordingly, in one embodiment, the inventive method further includes the step of using the raw seismic sensor data to produce quality indicators for the estimated positions. The quality indicators may include binning datasets, absolute noise data, signal-to-noise ratios, and seismic signal frequency content. The quality indicators may be used to validate the real-time survey data, spread control operating states, and drive commands.

In another aspect, the present invention provides a system for controlling a seismic survey spread while conducting a seismic survey, the spread having a vessel, a plurality of spread control elements, a plurality of navigation nodes, and a plurality of sources and receivers. The system includes a database for receiving input data including navigation data for the navigation nodes, operating states from sensors associated with the spread control elements, environmental data for the survey, and survey design data. The system further includes: a computer-readable medium having computer-executable instructions for estimating the positions of the sources and receivers using the navigation data, the operating states, and the environmental data; a computer-readable medium having computer-executable instructions for determining optimum tracks for the sources and receivers using the estimated positions and a portion of the input data that includes at least the survey design data; and a computer-readable medium having computer-executable instructions for calculating drive commands for at least two of the spread control elements using at least the determined optimum tracks.

In one embodiment of the inventive system, the position-estimating instructions, the optimum track-determining instructions, and the drive command-calculating instructions are contained in a common computer-readable medium.

In a particular embodiment, the inventive system further includes a computer-readable medium having computer-executable instructions for validating the calculated drive commands, and a network for delivering the validated drive commands to the spread control elements, whereby a desirable survey objective may be attained.

The inventive system otherwise contemplates and includes features of the inventive method summarized above.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1A:
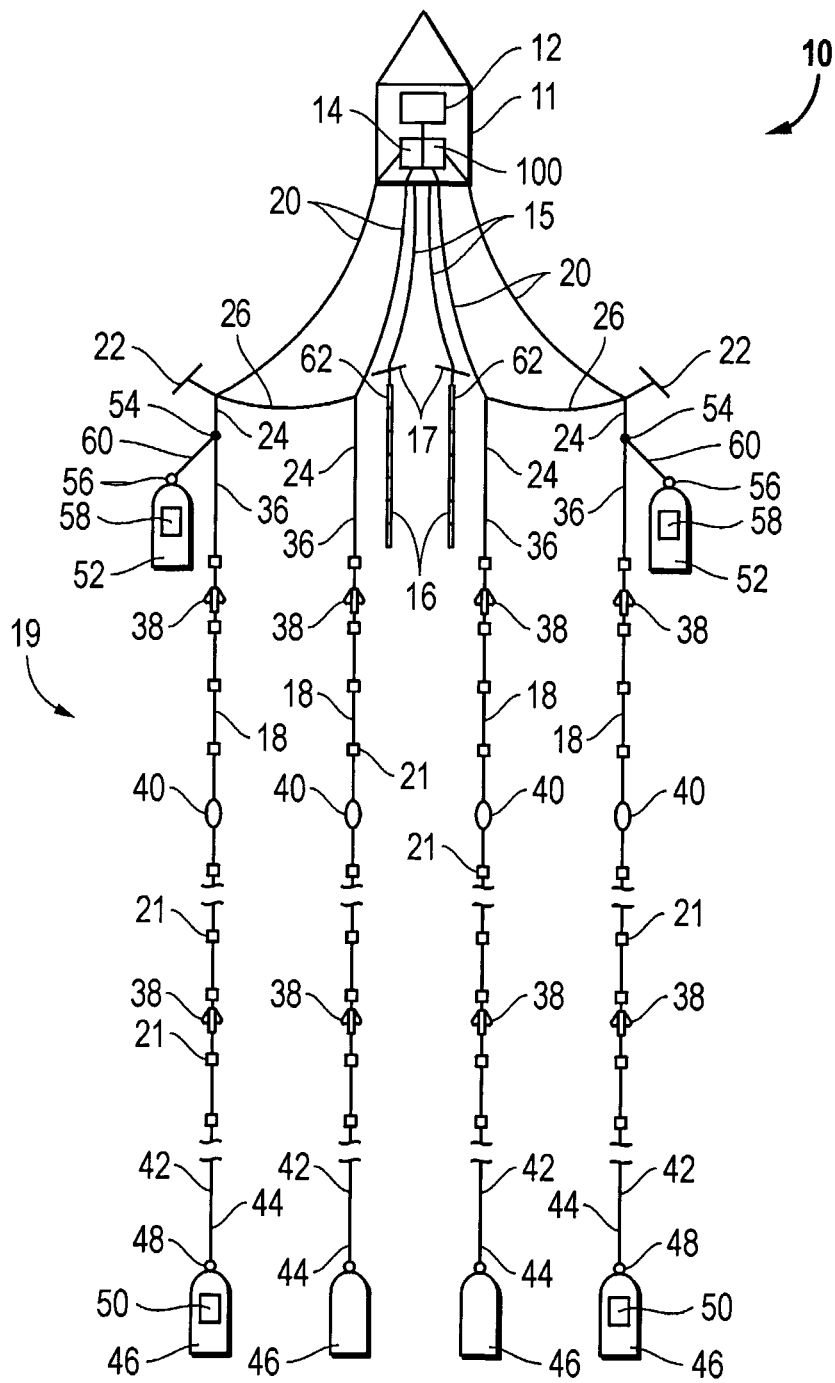
FIG. 1A is a plan view of a seismic survey spread for conducting a marine seismic survey.
Figure 1B:
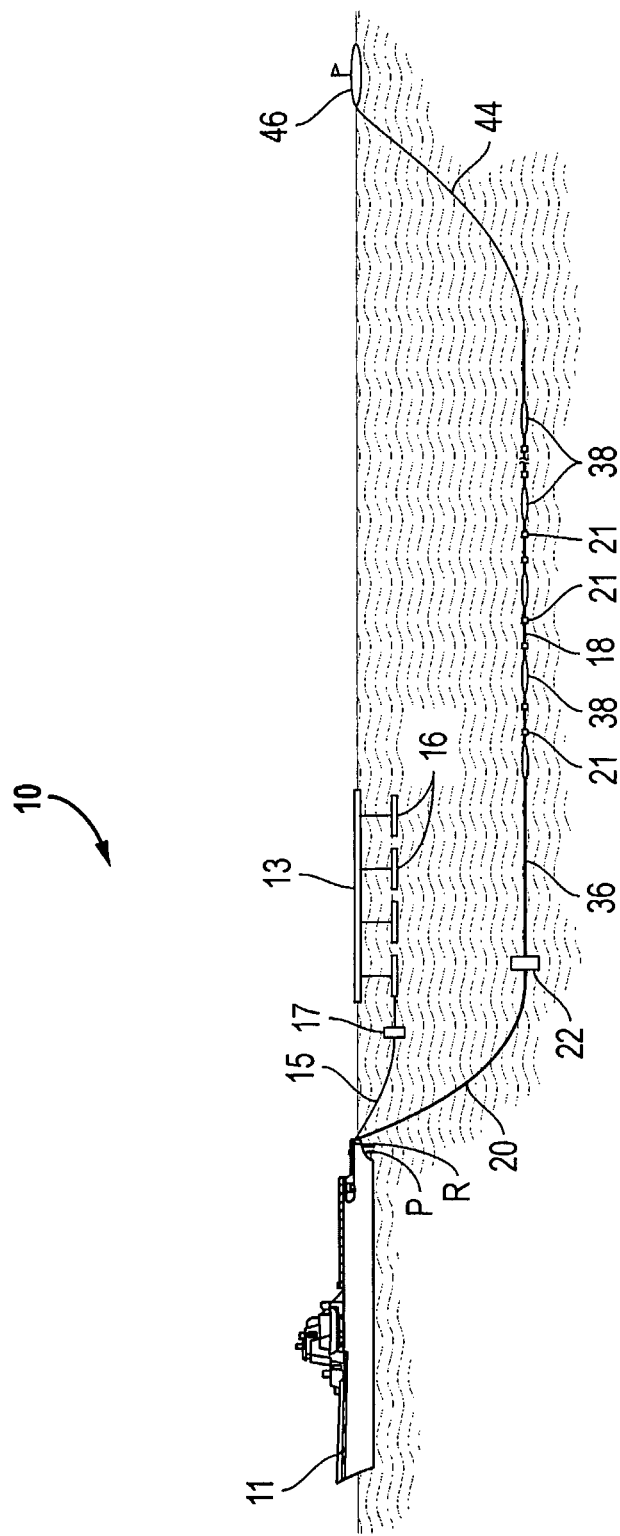
FIG. 1B is an elevational view of the spread shown in FIG. 1A.

FIGS. 1A-1B illustrate a typical marine seismic acquisition survey spread (also know simply as "spread") 10 for performing 3-D surveys. The spread 10 is characterized by a plurality of components, some of which are controllable and known as spread control components. The spread components will typically include one or more marine vessels 11, such as the vessels described in U.S. Pat. No. 6,216,627, and a plurality of components towed by at least one of the vessels. The towed components include cables such as lead-in cables 20, spreader lines 26, streamers 18, and source tow cables and pressure lines (both represented as 15), as well as sources 16, hydrophone sensors 21 within the streamers, and steering devices such as deflectors 22, streamer steering birds 38, and source steering devices 17.

The spread components may further include one or more vehicles (not shown) not tethered to the one or more vessels, such as the unmanned powered vessel described in U.S. Pat. No. 6,028,817, the autonomous underwater vehicle described in U.S. Pat. No. 6,474,254, or the seabed tractor described in International Application No. PCT/GB01/01930 (WO 01/84184).

The spread control elements typically include at least two of a rudder R, a propeller P, a thruster (not shown), one or more devices 17, 22, 38 for steering the towed cables and instruments, and one or more steerable flotation devices 46, 52.

More particularly, in the case of a Q™ vessel owned and operated by the assignee of the present invention, the vessel 11 is provided with a GPS receiver 12 coupled to an integrated computer-based seismic navigation (TRINAV™), source controller (TRISOR™), and recording (TRIACQ™) system 14 (collectively, TRILOGY™), and tows a plurality of seismic sources 16, typically a TRISOR™-controlled multiple air gun source of the kind described in our U.S. Pat. No. 4,757,482, and an array 19 of four substantially identical streamers 18. However, it will be appreciated that, in practice, as many as twenty streamers can be towed, for example by using the techniques described in International Application No. PCT/IB98/01435 (WO 99/15913) assigned to the assignee of the present invention. The streamers 18 are towed by means of their respective lead-ins 20 (i.e., the high strength steel or fiber-reinforced cables which convey electrical power, control, and data signals between the vessel 11 and the streamers 18). The span of the outer-most streamers 18 is controlled by two steerable front-end deflectors (SFEDs) called MONOWING™ deflectors, indicated at 22, connected to the respective forward ends 24 of the two or more outermost streamers. The SFEDs 22, which are described in detail in U.S. Pat. No. 5,357,892 assigned to the assignee of the present invention, act in cooperation with respective spreader lines 26 connected between the forward end 24 of each outermost streamer 18 and the forward end 24 of its adjacent streamer to assist in maintaining a substantially uniform spacing between the streamers 18.

Each streamer 18 includes a plurality (up to 4000) hydrophone sensors 21 distributed at spaced intervals along the streamer's length. Each of the hydrophones 21 is separately wired so that its output signal can be separately digitized and filtered, thereby permitting sophisticated processing known as digital group forming, as described in International Application No. PCT/GB99/01544 (WO 99/60421) assigned to the assignee of the present invention.

Each streamer 18 is made up of a large number of substantially identical streamer sections connected together end to end. Each streamer section comprises an outer plastic skin that contains several elongate stress members, e.g., made of Kevlar, and the hydrophones 21 which are separated by kerosene-saturated plastic foam spacer material, as described in U.S. Pat. No. 6,477,111 assigned to the assignee of the present invention. Alternatively, each streamer section may employ a "solid" construction such as the commercial offerings of Sercel and Thales Underwater Systems.

Each streamer 18 further has a plurality of inline streamer steering devices (SSDs) 38, also known as "birds," preferably Q-FIN™ birds of the kind described in U.S. Patent Application No. US 20020126575, distributed at 200 meter intervals therealong for controlling the streamer's depth and steering it laterally. Additionally, each streamer 18 has inline acoustic emitters or "pingers" 40 uniformly distributed therealong, the pingers being interleaved between the birds 38. The pingers 40 are part of a positioning and navigation system that is described further below.

The rearward ends 42 of the streamers 28, i.e., the ends remote from the vessel 11, are connected via respective stretch sections 44 similar to the stretch sections 36 to respective tailbuoys 46. The tailbuoys are provided with respective pingers 48, similar to the pingers 40, and respective GPS receivers 50.

The array 16 is further provided in the region of its forward end 24 with additional buoys or floats 52. More specifically, the further floats 52 are respectively connected to the streamers, often the 4 outermost, 18 at respective watertight electro-optical "tee" connectors 54 positioned between the two stretch sections 36 at the forward ends 24 of the outermost streamers, so as to be towed by the streamers. The buoys 52, which can be substantially identical to the tailbuoys 46, are provided with respective pingers 56 and GPS receivers 58, and are connected to their respective connectors 54 by respective stretch sections 60. Although the buoys 52 are shown in FIG. 1A as offset with respect to their streamers for clarity, in practice they are substantially in line with the streamers 18.

The seismic sources 16 are also provided with a GPS receiver, indicated at 62, and an acoustic receiver such as a hydrophone 21. The sources 16 are steerable via steering devices 17, such as the devices described in U.K. Patent Application No. GB 0307018.2 assigned to the assignee of the present invention.

In use, the seismic sources 16 and the seismic streamer array 19 are deployed from the vessel 11 and towed at about 5 knots substantially in the configuration shown in FIGS. 1A and 1B. The seismic sources 16 are periodically fired, e.g., every 10 seconds or so, and the resulting reflected seismic data signals are detected by the hydrophones 21 in the streamers 18, then digitized and transmitted to the system 14 in the vessel 11 via the lead-ins 20.

Although the sources 16 and the streamers 18 are shown in FIG. 1A as extending in perfectly straight lines behind the vessel 11, in practice they are frequently subject to lateral displacement, due for example to wind and wave action and currents (as described further below). Thus, in order to build up an accurate positional representation of the earth strata in subsurface area being surveyed, it is essential to determine accurately the respective absolute positions (i.e., in latitude and longitude) of the sources 16 and the hydrophones 21 for each shot produced by the sources. This has typically been done for the sources 16 using the GPS receiver 62. The respective positions of the hydrophones 21 are determined with respect to one or more of the GPS receivers 50, 58 and 62 by triangulation, using an acoustic ranging and positioning system based on the pingers 40, 48 and 56 operating in conjunction with selected ones of the hydrophones 21, as described in U.S. Pat. Nos. 4,992,990 and 5,668,775, both assigned to the assignee of the present invention. Thus a completed seismic survey results not only in a vast amount of seismic data, but also a vast amount of positional data defining the respective positions of sources 16 and the hydrophones 21 for each shot produced by the sources. From this positional data (a.k.a. navigation data), the shape of the path or track followed by each streamer 18 throughout the survey can be determined.

Figure 2:
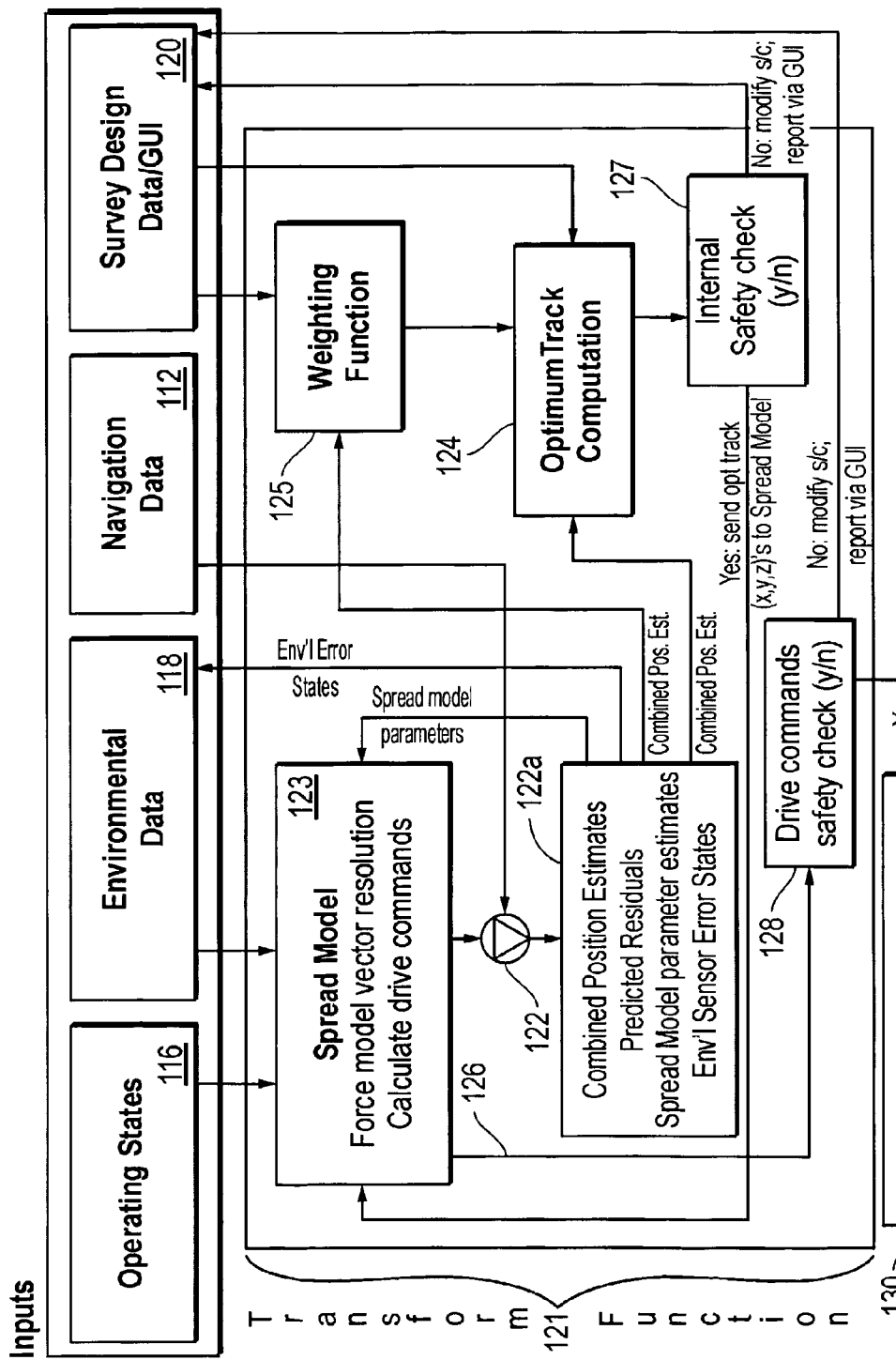
FIG. 2 is a flow diagram of a method of for controlling the spread in accordance with one aspect of the present invention.

With reference now to FIG. 2, the present inventive method includes the step 110 of collecting input data, including navigation data 112 for the navigation nodes, operating states 116 from sensors associated with the spread control elements, environmental data 118 for the survey, and survey design data 120. The set of collected input data may be acquired from pre-survey information, operator input, the present survey (near real-time or real-time), and from simulated survey information.

Navigation Data

Navigation data 112 is available from the spread 10, as described above, through the determination of the three vectors of position, velocity, and acceleration for a plurality of points (navigation nodes). Subsets of the seismic hydrophones along the streamer are designated as acoustic positioning receivers. These receive a unique acoustic signal from inline transmitters typically every 400 meters along the streamer. Combined, the transmitters and receivers give acoustic reference points typically less than each 100 meters along any streamer, as described in U.S. Pat. No. 5,668,775. The end points of the streamers are controlled by GPS reference points that tie the acoustic navigation nodes to the Earth Centered Earth Fixed coordinate system. The connection between the GPS references and the acoustic nodes is made through a combination of known distances, acoustically measured distances, and directions measured by compasses. The totality of these measures is used to give coordinate estimates to each of the navigation nodes in a least squares adjustment computed at each shot point aboard the vessel.

The density of these navigation nodes and precision of the position estimates are sufficient to give an adequate picture of the overall and local spread components. These navigation data are measures of the positional responses of the spread 10. The three navigation-based vectors can also be used to calibrate local inertial navigation devices. These local devices can give precise estimates of position, velocity, and acceleration to the spread control system, allowing the system to calibrate itself at a higher frequency than the acoustic network position updates are available. The navigation updates are also useful to calibrate the inertial devices themselves, which typically suffer from an accumulating error, commonly called drift. Calibration is further discussed in greater detail below.

Operating States

The sensors associated with the spread control elements for producing the operating states 116 collected among the input data include one or more sensor types of tension, water flow rate, vertical inclination, body orientation, acceleration, velocity, and position. These sensors or measurement devices will, in one embodiment of the present invention (described below), provide input to a hydrodynamic spread model that is used to describe the dynamics of the spread 10.

One set of operating states pertains to the vessel 11. These include the vessel heading, speed, rudder angle, propeller pitch, and vessel motion (i.e., heave, pitch and roll). Changes in these will result in cross-line and in line coordinate changes in the tow point locations at the rear of the vessel 11.

Another set of operating states relates to the steering devices 17, 22, and 38, and describes the water velocity over a lifting body such as a deflector wing. The sensors give the orientation of the device 22, e.g., relative to a course made good and water speed over the lifting bodies. The sensors further indicate the wing angles and changes in wing angles in relation to the water flow.

These operating states can be translated into forces exerted by the steering devices. The sum of these forces, distributed over the length of a streamer 18 or connected to the points on the source array, and in opposition to the water induced forces against the towed body surface area, (gun array floats for example also called sausages), give:

1. streamer shape starting from the tow point (origin);
2. center of source; and
3. individual source array positions relative to their vessel tow points.

Tension on the towing cables is another important operating state that is input—in one embodiment—to a hydrodynamic model. This is predominantly a function of water velocity relative to the bodies attached to the tension meters, and drag. In addition, tension is used to determine if the towing lines are approaching their limits, constraining the amount of steering forces to be exerted by the steering devices.

Winch counters report the length of towing cable deployed, which, when combined with the SFED forces, determines the orientation of the spread front end.

These, and other various operating states, may be combined in the force model to give the force vectors that determine the shape of the spread components under tow. This is described further below in reference to spread models such as the force model.

Environmental Data

The environmental data 118 collected among the input data include one or more data types of current, salinity, temperature, pressure, speed of sound, wave height, wave frequency, wind speed, and wind direction. The collected data includes pre-survey and present survey data.

The tidal currents in the area can be predicted using pre-survey tidal current tables published by several sources. These include the British Admiralty, the National Oceanographic and Atmospheric Administration (NOAA), the Service Hydrographique et Océanographique de la Marine (SHOM). For areas where there is thought to be a strong tidal current regime, the survey lines will be scheduled to coincide periods of low current. Periods of high current will, to the extent possible, be used for other survey maneuvers such as turns and run in.

Further, a survey history of the area can be reviewed to identify the historic degree of feather experienced in the survey area. Feather statistics may be archived in a database for subsequent use. Feather is an indirect measure of current in a survey area. This measure can be used to indicate magnitude, direction and temporal and spatial rates of change in the area. Spatial frequency is related to streamer length. Feather can give an indication of spatial frequency by relating the speed made good of the streamer tail to rate of change in feather. Rates of change in feather will give the survey planners an idea of the response time required for the spread control system they are specifying.

Units of time in the seismic data acquisition process are typically shot points. Long period can then be defined as some number of shot points into the future corresponding to the length of time the present environmental conditions will persist.

As an example, in tidal shooting the tidal current cycle times are well known. Seismic lines have for at least 15 years been planned to get the same current or temporal current gradient along adjacent lines in order to reduce infill. Several seismic exploration software providers offer survey line planning software to anticipate temporal and spatial current changes during seismic acquisition.

In addition, any historical current data available may be reviewed to identify the direction of the strongest currents. If the geophysical objectives allow, the line directions are preferably planned to be parallel to the predominant current direction. This will give the least feather and straightest streamers. Such data is available in mature oil producing areas due to the need for current knowledge for rig and floating production storage offloading (FPSO) maneuvers.

Several measurement sources of current data are available for measurement during a survey. Vessel hull mounted Acoustic Doppler Current Profilers (ADCPs) measure current some hundreds of meters before the source array and spread front end. Current meters mounted on semi-permanently or fixed structures in the survey area, (e.g., bottom mounted rigs and FPSOs) can report local current via a telemetry link to the vessel 11 in real time. Work or chase boats, or any other mobile platform including remotely operable vehicles (ROVs), having current-measuring devices aboard can precede the spread 10 along the survey track and telemeter the current regime the spread will encounter in the future. Satellite imagery provides knowledge of macro scale loop currents and warm water mass eddies.

All sources of current are stored in a Geographic Information System (GIS) database with a time tag. This type of system is commonly used to manage spatially distributed data. An example is the type of data management system used by Horizon Marine. For short periods the data can be considered valid, (e.g., an hour or less). Longer period trends can be derived based on the historical changes observed throughout the course of data acquisition and used to anticipate conditions on adjacent lines. Further, the tidal driven component of current that was predicted as described above can be calibrated based on in situ measurements. The frequency content of the tidal signal being known, the amplitude and phase shifts predicted from tables can be adjusted to fit the exact locale of the survey.

In situ wind meter data, obtained from meters or sensors located on the same platforms mentioned above for current, can be treated exactly as current meter data. The use of this data is of course to model forces expected on objects on the sea surface. In addition, surface layer water can be moved by air friction and cause surface wind driven current. The effects of wind-driven surface currents reach down to several meters, which is presently the zone for towing streamers.

Dynamic oceanographic models of ocean cubes, such as those offered by Horizon Marine, can be used to predict various ocean phenomena. These models are roughly equivalent to weather prediction models and are analogous in their accuracy of prediction as a function of time. These models require inputs such as current measures, and wind for their calibration and boundary conditions. Two of the main drivers for these models are water density differences and earth motion (i.e., Coriolis force). Density differences are inferred from temperature, pressure (depth), and salinity data collected horizontally throughout the survey area and vertically through the water column by probes that are either disposable or retrievable. These data map the density interfaces that together with earth rotation, wind and other forces cause water bodies of different densities to move in relation to one another. The vertical density gradient is largest in the upper layers due to solar warming and near land where water originating from land enter the sea and where vertical land masses cause water of differing densities to change depth, (e.g., coastal upwelling).

Dynamic oceanographic models are well known but are often macro scale (i.e., areas many times larger than a survey area). Recent advances in computing power have lead to the development of models suitable for meaningful prediction of water body movement in areas on the scale of a survey area. Typical numerical models are described in *Introductory Dynamical Oceanography* by Pickard and Pond. The use of modeling to predict currents that will be encountered by a spread acquiring a seismic survey may be applied in situ to anticipate current. In situ current and wind measurements will also be used to calibrate the oceanographic model predictions. Greater frequency and horizontal expanse of the density measurements results in better resolution of the water mass boundaries and improved modeling and calibration.

Any subset of current determination methodologies described above, with any degree of calibrated modeling, or un-calibrated modeling, as well as direct measurement, is valuable for acquisition since it can reduce acquisition time by increasing production time. The older the data, the less valuable it is. Presently-obtained information (near-real time and/or real time) will be used to estimate forces that will be encountered along the acquisition line.

The collection of water density data as described above is presently and will continue to be used to estimate acoustic wave front propagation between source and receiver points defined as navigation nodes throughout the spread.

Wave height measurement can be obtained from satellite imagery as well as in situ from heave meters and high-frequency GPS vertical velocity estimates. Changes in water column position have an impact on seismic recording and this fact is responsible for the depth-keeping requirement imposed on the SSDs. Wing angle changes for the purpose of controlling depth will impact a steering device's ability to steer laterally. Currently, the Q-FIN™ SSD controller combines horizontal and vertical positioning. Knowledge of wave height aids in determining the available lateral steering ability while maneuvering the streamer. Wave height gives a measure of water particle motion in three dimensions through the water column. This is in effect a small scale current. The amplitude of the wave height will dictate whether current is a significant force at streamer depth.

Input Data Collection

The pre-survey data collected among the input data preferably includes environmental sensor data. The portion of the input data 110 that is collected as real-time survey data may include one or more data types of cable tension, water flow rate, inclination, orientation, acceleration, velocity, positioning, spread control element setting, environmental data, seismic signal and noise data, and operator input. The collected positioning data may include data from one or more sensors of the group consisting of GPS receivers, echo sounders, depth sensors, acoustic ranging systems, magnetic compasses, gyrocompasses, radio-location systems, accelerometers, and inertial systems. The spread control element setting data may include one or more inputs of the group consisting of thruster setting, propeller pitch, propeller rotation speed, rudder angle, towing cable tension, winch position, deflector orientation, deflector angle, deflector water speed, streamer steering device orientation, and streamer steering device wing angle. The operator input data may include spread parameter settings and environmental data.

The simulated survey data may include one or more data types of simulated pre-survey, simulated operator input, simulated present survey, simulated near real-time, simulated real-time survey, and simulated environmental data.

The raw seismic sensor data collected during the seismic survey may also be characterized as input data. Accordingly, in one embodiment, the inventive method further includes the step of using the raw seismic sensor data to produce quality indicators for the estimated local water flow at the streamer surface. The raw seismic sensor data is useful to verify the force model and current expectations. Measured ambient noise is compared to predicted or expected ambient noise given the expected water flow over the surface of the streamer. Large differences between the expected and recorded noise indicates either the recording system is in error or the current is different than anticipated. Changes in ambient noise along the length of the streamer gives the spatial current gradient The quality indicators may include binning datasets, absolute noise data, signal-to-noise ratios, and seismic signal frequency content. The quality indicators may be used to validate the real-time survey data.

Survey Design

The survey design data 120 collected among the input data includes one or more data types of area, depth, shooting orientation, line coordinates, source and receiver positions, required coverage, constraints, optimizing factors, and historical data. Those skilled in the art will appreciate that the survey design data further includes spread performance specifications 114, as described below. The survey design data may also be characterized by survey objectives and constraints, and may be substantially defined by pre-survey information.

Survey design is relevant since geophysical objectives are constraints within which all seismic surveyors must work. General survey design will encompass all aspects of a survey objective. Certain of the geophysical objectives will impact the acquisition. These include:

1. number and length of streamers;
2. streamer separation;
3. source array dimensions;
4. shot point spacing; and
5. line direction Once the geophysical objective(s) for the survey design have been determined, it becomes important to identify the factors that will make the seismic data acquisition difficult and try to mitigate them. If, for example, an objective of the survey is time lapse (4-D), a factor making acquisition difficult is a non-straight prior or base survey trajectory. Knowledge of the trajectory is gained by reading the "P190" data produced from the prior survey. These trajectories may then be compared to a trajectory that can likely be acquired considering the selected acquisition hardware. If, however, a principal objective is conventional coverage, pre-plot lines will determine the survey tracks. For any geophysical objective, however, local obstructions and bathymetry will be constraints to the planned tracks.

The above description of the use of survey design data, spread control element specifications, environmental data, and the operating states particularly apply (but are not limited) to measurements taken during the present survey. These data are input to a general transform function 121 that gives a set of desired output, as shown in FIG. 2 and described further below.

The spread control elements selected for the survey design will be chosen to meet the anticipated seismic data acquisition requirements. In addition, the vessel track will be constrained by the survey objectives. Further, obstructions in the survey area, and bathymetric data will be monitored for proximity to the spread during the survey operation.

Performance Specifications

The performance specifications 114 collected among the survey design data 120 is typically hydrodynamic, and may include vessel profile and characteristics, vessel maneuvering limitations, towed cable drag and other physical characteristics, steerable cable device characteristics, source drag and other physical characteristics, steerable source device characteristics, deflector characteristics, flotation device drag and other physical characteristics, and winch operation characteristics. Such individual device specification data is typically available from the manufacturer and/or from historical data. These inputs may, among other uses, be combined with the geophysical survey objective constraints to conduct a simulated survey that is useful for survey design and can give a provisional combined towing system behavior specification. Thus, for example, various spread requirements and specifications may be defined before the survey takes place, such as spatial frequency of streamer steering devices along the streamer, number of steerable front-end deflectors to deploy, number of source steering deflectors to deploy, and computing power required for expected cycles times (related to current gradient). Further, simulations of this sort can be used to design spread components for improved control performance. Examples of parameters that could be varied in simulations are, cable diameter, cable density, more hydrodynamic cable body shapes and steering devices.

Position Estimation

Having collected the input data, the positions of the sources and receivers are estimated using the navigation data 112, the operating states 116, and the environmental data 118. More particularly, the positions are estimated according to a spread model 123 within the transform function 121. The spread model calculates a first set of estimated positions using input that includes at least the operating states 116 and the environmental data 118. The environmental data is used as described in FIG. 9 to give the natural feather. Added to the natural feather is some amount of steered feather, demanded from the SSDs 38. An example of an operating state contributing to position estimation is a steering input/correction for achieving a desired feather angle. Steered feather is obtained by the exertion of force in the cross-line direction by the SSDs along the streamer 18. The equation governing the exerted force is based on the wing lift equation:

$$L = C_l * A * \rho * \frac{V^2}{2} \qquad \text{Eqn 1}$$

where:
$C_1$=lift coefficient;
A=wing surface area:
V=water velocity with respect to the wing angle of attack; and
ρ=water density.

The angle of attack is adjustable, and is thus another operating state. Changes in the angle of attack create an acceleration or change in force exerted by the SSDs integrated or coupled to the streamers.

The collected navigation data 112 includes a second set of estimated positions. A subset of the seismic hydrophones 21 along the streamer are designated as acoustic positioning receivers. These receive a unique acoustic signal from inline transmitters typically every 400 meters along the streamer. Combined, the transmitters and receivers give acoustic reference points (i.e., navigation nodes) typically less than each 100 meters along any streamer, as described in U.S. Pat. No. 5,668,775. The end points of the streamers are controlled by GPS reference points that tie the acoustic navigation nodes to the Earth Centered Earth Fixed coordinate system. The connection between the GPS references and the acoustic nodes is made through a combination of known distances, acoustically measured distances and directions measured by compasses. The totality of these measures are used to give coordinate estimates (the second set of position estimates) to each of the navigation nodes in a least squares adjustment computed at each shot point aboard the vessel.

The first and second sets of estimated positions are combined (see node 122) within the transform function to produce the (combined) estimated source and receiver positions and predicted residuals (see box 122a). The predicted residuals represent the difference between the first and second sets of estimated positions, and are used to estimate a set of parameters that characterize the spread model 123. The spread model parameters are used to calibrate the spread model. The predicted residuals may further be used to estimate error states for sensors used to collect the environmental data.

Optimum Track Determination

The optimum tracks are determined at 124 according to a weighting function 125 within the transform function 121. The weighting function receives as inputs the survey design data 120 and the most recently estimated positions of the sources and receivers (see box 122a). The input from the survey design data may include performance specifications for the spread control elements, such as steering constraints. Other survey design criteria include geophysical and operational requirements. The geophysical requirements may, e.g., include achieving desired coverage of a subsurface area, or duplicating the seismic signal ray paths of a prior survey, and controlling the seismic sensor noise. The operational requirements may, e.g., include defining one or more safe passages for the spread through dangerous areas, determining an optimum time to perform one or more lines of the survey, and reducing non-production time. The weighting function 125 is used to apply relative weighting coefficients to the inputs for calculation of optimum tracks for the spread by the transform function. "Optimum track" determination includes an optimum spread body shape determination, and the corresponding shape change along a track.

In order to achieve the objectives of a seismic survey, some set of coordinates (i.e., a "track") must be occupied. The first estimate of a desirable or "optimum" survey track is made in the survey design phase described above. In situ, this track will be re-computed at some frequency, depending on the forces present and the frequency of navigation updates. Even if the re-computation of the optimum track occurs at a high frequency, the response time of the system will be considered when issuing drive commands to optimally realize the optimum tracks. In areas of small current, the survey design track or pre-survey track may be achievable with little or no effort on the part of the spread control system. In other areas, a high frequency re-computation of the best-cost track may be required. The re-computation can only be achieved if there is a navigation update to reveal the success of the spread model-driven prediction. The re-computation is only needed if the navigation update shows that the predicted trajectory has deviated from the track by more than the probable error bounds set (also referred to as the no-change corridor).

In practice, the physical constraints imposed by nature combined with the steering system limits will likely prevent the intended pre-survey track from being followed to some degree. The path determination is made with consideration for the target coordinates and the ability to reach the coordinates given a potential for spread control.

In one embodiment of the optimum track computation 124, a best-cost map method as described by U.S. Pat. No. 6,629,037, assigned to the assignee of the present invention, is employed. The successive candidate cells (track segments) are weighted by a function that incorporates a combination of factors that may generally be characterized as steering constraints. These factors include:

1. pre-survey track of all spread components;
2. a separation of importance for spread components, analogous to the offset weighting in Nyland;
3. the steering potential available;
4. the response time of the system;
5. the stability of the system; and
6. the physical limits of the system.

The optimum track is first checked for collision potential, with both spread elements and external obstructions, before being forwarded to the spread model to be transformed into the drive commands that will realize the optimum track. The track optimization safety criteria include verification (see box 127) that the trajectory of any spread element poses no danger of collision. A "no" result will cause feedback through the GUI to the user that either the steering constraint parameters are not set correctly or that the optimization algorithm is flawed. The user then has the option to take manual control of the steering system or modify the steering constraints. Steering constraint modification is for example, if the streamer separation limits are exceeded, the user may opt to allow the streamers to pass closer to each other. For another example, if a spread element (e.g., tailbuoy) will pass too close to an obstruction such as a Floating Production SO, the user may opt to have the FPSO change position and enter this into the survey design data flow so that the optimum track may be realized safely.

A "yes" result to the safety check will lead to the submission of the determined optimum tracks to the spread model 123 for use in computing new operating states (i.e., drive commands) for the spread control elements.

The drive command optimization computation results in a set of drive commands—primarily steering commands—that will bring about changes in the positions of the spread components as part of the transform function 121. The drive command optimizations will be constrained by the projected environmental conditions and the steering devices available to enable the steering. The definition of optimization will be determined by the optimum track.

Drive Command Calculations

Drive commands (also referred to herein as new operating states that result from the optimum track determination) are calculated in the spread model 123 for at least two of the spread control elements using the determined optimum tracks (from box 124) that have been validated (at 127). The spread response times are estimated by the spread model and taken into account when calculating the drive commands. The drive commands are also regulated to maintain stability of the spread, and validated (at 128) before being delivered to the spread control elements.

Each of the drive commands calculated with the inventive method may be used to control at least one of position, speed, and heading for one or more components of the spread. Typically, the drive commands will include commands for controlling at least one of the vessel propeller, vessel thruster, spread component steering devices, and the vessel cable winches. The vessel cable winches, in particular, may be dynamically controlled.

The optimization computation results in a set of drive commands—primarily steering commands—that will bring about changes in the positions of the spread components as part of the transform function 121. The drive command optimizations will be constrained by the projected environmental conditions and the steering devices available to enable the steering. The definition of optimization will be determined by the objective(s) of the drive commands.

The optimization criteria include verification (see box 127) that any set of mechanically-induced drive commands or force changes that are required to achieve a determined optimum track are within safety requirements for the survey. Typically, the safety requirements will fall into one of equipment safety constraints and human safety constraints. A "yes" result to the safety check will lead to the submission of the determined optimum tracks to the spread model 123 for use in computing new operating states (i.e., drive commands) for the spread control elements. Thus, e.g., upon detection that certain of the spread control components have failed (such as the vessel propeller or rudder, deflectors, source or streamer steering devices), the system will assume a "maximum safety" mode that restricts drive commands in the interest of equipment and personnel preservation.

Potential Determination

The potential for spread control is measured by the spread model 123, which in a presently preferred embodiment is a hydrodynamic force model that determines the amount of force available after subtracting the force already consumed at the present shot cycle from the total potential force. Steering potential, while derived from available force, can be expressed in units of feather angle (e.g., degrees, or any angular measure). Depending on the survey design, including the acquisition objective(s), an analysis is made to determine whether drive command changes are needed and, if so, which changes are appropriate. Force by definition has an acceleration component. The system performance capacity, including the steering potential available, is predicted by the theoretical force-driven model and the spread control element drive commands that should give the necessary accelerations.

Delay, System Response, and Position History Relations and Error States

As mentioned previously, the position histories (first estimated position sets) predicted by the spread model 123 are compared with position history estimates resulting from the navigation solution (second estimated position sets), forming the predicted residuals. The predicted residuals are then related to the error states defined within the force model inputs, the force model parameters, and the spread control element performance specifications. In an error-free model, predicted responses will occur on schedule, or, in other words, system delays will be accounted for in the predicted response. Before the model learns from the navigation solution what the system responses are, through calibration, model predictions will have some degree of error, with the error magnitudes depending on the quality of the model and inputs.

Before a history of comparisons is available, the navigation solution-based histories (second estimated position sets) will be infinitely higher in weight compared to the force model-based position histories. Practically, this means the combined navigation and predicted model position estimates are equal to the navigation estimate with nearly all the predicted residual being attributed to the spread model. After the model is calibrated, the force model expectation of position history should consistently agree with the navigation-based measured history to within the expectation of error in the measured, or navigation solution, position estimates.

Drive Command Calculations

Drive commands (also referred to herein as new operating states that result from the optimum track determination) are calculated in the spread model 123 for at least two of the spread control elements using the determined optimum tracks (from box 124) that have been validated (at 127). The spread response times are estimated by the spread model and taken into account when calculating the drive commands. The drive commands are also regulated to maintain stability of the spread, and validated (at 128) before being delivered to the spread control elements.

Each of the drive commands calculated with the inventive method may be used to control at least one of position, speed, and heading for one or more components of the spread. Typically, the drive commands will include commands for controlling at least one of the vessel propeller, vessel thruster, spread component steering devices, and the vessel cable winches. The vessel cable winches, in particular, may be dynamically controlled.

The drive commands are typically determined according to geophysical and operational requirements. The geophysical requirements may, e.g., include achieving desired coverage of a subsurface area, or duplicating the seismic signal ray paths of a prior survey, and controlling the seismic sensor noise. The operational requirements may, e.g., include defining one or more safe passages for the spread through dangerous areas, determining an optimum time to perform one or more lines of the survey, and reducing non-production time. Accordingly, alternative drive commands may be calculated for effecting a safe passage between two or more definable locations.

Invention Applications Other than Real Time Surveying

An additional role of the present invention is to provide the operator with "intelligent finishing" or scenario-planning. The operator expresses basic intentions to the transform function 121 for a route between two or more points and the module evaluates possible safe alternative passages for the entire spread which fall within the spread steering capabilities and presents them to the operator for selection. This could be used when arrival at a particular point at a particular time is required. Another use could be when a safe close passage to a permanent or semi-permanent structure or feature in the survey area is required for operational reasons.

Intelligent-finishing uses the same extrapolation into the future but the limits imposed on solutions are different to those used in a surveying environment. In this case the emphasis is on safety and travel time rather than ensuring that each individual element of the spread follows an exact pre-defined path. It might be that exclusion zones define areas that individual elements should not enter. The extrapolation time will normally be longer and the uncertainties within the system which can be accepted are greater. In this case the operator chooses which scenario to accept.

Still another application of the invention applies to development simulation. Actual input data is run through the transform function 121 with steering devices under development. Projected improvements in performance are used to gauge the value of developing the steering device improvements.

Based on the objective of the steering system, a vessel track, streamer front end track, source track, and streamer feather may be computed to give the best positioning of the spread, driven by the spread control elements. This will be described in greater detail below using a force model as an exemplary spread model 123.

Applications Overview

The table that follows presents typical examples of optimization criteria according to broadly defined survey periods:

TABLE 1

| | | Optimization Criteria | | |
|---|---|---|---|---|
| Event | Pre-Conditions | Objective | Output | Constraint |
| Pre-Survey | None | Evaluate survey with required bin | Survey shooting plan | Avoid hazard to own or other |

TABLE 1-continued

| | | Optimization Criteria | | |
|---|---|---|---|---|
| Event | Pre-Conditions | Objective | Output | Constraint |
| | | coverage in minimum number of vessel passes | | equipment |
| Pre-Survey | None | Determine feasibility of performing successful survey in a given area | Worst-case error ellipses; major risk factors, spread control elements or system required, maximum heading changes likely | Maintain stability of system |
| Survey | Current state of survey | Complete survey with required bin coverage in minimum number of vessel passes | Survey shooting plan | Avoid hazard to own or other equipment |
| Survey | All gear in water; ready to shoot | Move from current position to start of next pass | Steering plan for vessel and equipment | Avoid hazard to own or other equipment |
| Survey | All gear in water; ready to shoot | Move from current position to a desired position | Steering plan for vessel and equipment | Avoid hazard to own or other equipment |
| Survey | All gear in water; ready to shoot/shooting | Control vessel and other spread control components according to original shooting plan | Drive commands delivered to spread control components | Abide by pre-defined safety margins |
| Deployment/ recovery | All/some gear on vessel | Deploy a streamer | Steering plan for vessel and equipment | Minimize risks |
| Deployment/ recovery | All/some gear in water | Recover a streamer | Steering plan for vessel and equipment | Minimize risks |
| Deployment/ recovery | All gear in water | Streamer maintenance | Steering instruction to workboat; streamer commands to aid maintenance | Minimize risks |
| Change(s) in spec, conditions, environment | Current state of survey; changes | Complete survey with required bin coverage in minimum number of vessel passes | Survey shooting plan | Avoid hazard to own or other equipment |
| Failure | Failure of vessel propulsion | Restore propulsion | All control systems set to safest position | Maximize safety for equipment and personnel |
| Failure | Failure of deflector | Repair/replace failed deflector | All control systems set to safest position | Maximize safety for equipment and personnel |
| Failure | Failure of vessel steering | Restore steering | All control systems set to safest position | Maximize safety for equipment and personnel |
| Failure | Failure of source steering device | Repair/replace or make fail-safe the failed device | All control systems set to safest position | Maximize safety for equipment and personnel |
| Failure | Failure of streamer steering device | Repair/replace or make fail-safe the failed device | All control systems set to safest position | Maximize safety for equipment and personnel |

Accordingly, alternative drive commands may be calculated for effecting various spread trajectorys.

Transform Function

As mentioned previously, the transform function 121 executes the position-estimation, optimum track-determining, and drive command-calculation steps 122, 124, 126 of the inventive method. The spread model 123, based on the inputs also mentioned earlier, generates a first set of predicted position estimates and/or spread body shapes ahead until the next navigation update. This set of predictions is combined with the navigation system position estimates (a second set) to get the combined source and receiver position and/or shape estimates. The predicted residuals (difference between first and second sets) are used to estimate certain key spread model parameters, and any error states associated with the environmental measurements such as current or wind. The combined position estimates are delivered to the optimum track estimation algorithm 124 and a weighting function 125.

The resulting spread model parameters are fed back to the spread model algorithm 123. Further, estimates of the environmental measurement error states are fed back as calibration values to the environmental measuring devices (see box 118).

The optimum tracks are preferably determined at 124 according to a weighting function 125 within the transform function. In a particular embodiment, the weighting function receives as inputs the survey design data 120 (including the performance specifications), as well as the combined position estimates. The weighting function assigns relative importance, or weights, to each of the combined position estimates and the survey design data 120 (including, in particular, the steering constraints) to derive an optimum track or shape for the spread. "Optimum" in this sense means satisfying as closely as possible both the steering constraints and survey objectives, given the present spread position estimates.

Besides the previously mentioned force model, the spread model may be driven by a pure stochastic model of the spread components, it may be a closed loop control system as described in International Patent Application No. WO 00/20895 (PI) controller based on a force model), a neural network, or it may employ one of the L-norm fitting criteria to estimate spread behavior. Essentially, any estimation theory method suitable for optimized coordination of a suite of spread control elements may be applied to achieve a desired track for all or part of the spread. For the case of a neural network, the spread model is patterned on the teachings of U.S. Pat. No. 6,418,378 (training model using "snapshot" spread coordinates).

If the transform function determines (box 124) that a substantially different spread shape or track is required or desirable, this spread alteration is checked or validated by an internal safety check (see box 127).

If the safety check determines the new track or shape is safe ("yes"), the coordinate set or shape description for the spread control elements that comprise the newly estimated optimum track are fed to the spread model 123 to obtain the appropriate drive command corrections. As an example of an optimized next step, the determination of which controllable device or devices should be commanded is undertaken. An initial search is made using the principle that the device to be commanded is the lowest in the chain that can affect all out-of-limit or undesirable conditions. Thus, if the streamer array 19 and the source array 16 are out of position in the same direction, changing the position of the vessel 11, the "parent" towing device, is most likely to be the optimum strategy. If the streamer and source arrays are out of position in opposite directions, changing individual controls on each subsystem might be optimum. An optimum change is computed, using the relationships established earlier, for example, a one degree rudder change might change the vessel lateral motion by 0.1 meters on average over five seconds.

For validation, this change is then extrapolated forward in time to check the effects on the entire spread over a period of time at least corresponding to next update cycle. If the effects are undesirable, another combination of control changes is established and the extrapolation process repeated. No matter what the limitations on the steering available to the spread control elements, there is a definable, optimal steering command set. It may be that no change is possible that achieves an initial definition of optimum or desirable results over the forward extrapolation period. In this case, the definition of optimum is modified such that changes that achieve the desired results over the longest period of time are searched for.

If the internal safety check 127 determines that the computed optimum track is not safe, this "no" response is fed back to the operator online through a Graphical User Interface (GUI). The operator is thereby notified of the track components that exceed the safety check limits and is prompted to modify the survey design to mitigate the safety violation. This may entail re-weighting certain target points along base survey. The operator has the option to take control of the system and steer manually for the period of faulty steering to ensure no accidents occur.

In general, when a correction is needed, there are always two types of corrections that may be made: one which removes the source error by making a control change at or ahead (upstream) of a problem area; and one which removes the propagation of an error or problem by making control changes behind (downstream) the problem area.

When the drive commands are chosen by the spread model 123 to realize the safe validated optimum track, the drive commands themselves are validated at 128. This is a failsafe mechanism for the drive command choice algorithm. If the drive commands are validated ("yes"), they are delivered to the spread control elements to be carried out (see 130).

If the drive commands fail the validation step ("no"), the operator is again alerted to an algorithmic failure and given the option to take manual control or modify one of the parameters that make up the steering constraints.

The transform function cycle can occur as often as navigation data is available and computing power permits. Alternatively, the cycle can be carried out less frequently, and the spread model constantly re-issues drive commands that will cause the spread to conform to the most recently determined optimal shape or track.

Over time, an optimum spread model is developed through calibration, essentially a learning process, comparing measured position history with expected model outcomes. This model will vary according to the equipment within the spread and the prevailing sea and weather conditions. The spread model 123 is primed with a coordinate set for the spread components to determine the starting-point in the model. It then builds up a dynamic model view of the spread components based on prevailing sea conditions of currents and tides and the effects of spread control elements, among other things mentioned herein, and calibrates or otherwise trains the spread model. System calibration is achieved by establishing the relationship between the system parameters and the predicted residuals. The cause of the predicted spread component coordinate changes will always be due to at least one of spread control element operating state changes, sea current and near surface wind. The natural forces can be known by direct measurement with current and wind meters, inferred by spread element changes measured with the navigation solution, or by model prediction in an ocean and/or weather prediction model, such as the models available through Horizon Marine.

Long Term Planning

In areas where the most significant influences are generated by highly deterministic and predictable phenomena such as tidal currents, these inputs can be used to generate an optimal set of steering commands up to months before the actual survey time. The spread model 123 may then extrapolate forward using the calibrated spread model parameters.

Real Time Adjustments to the Planned Optimal Track

During the execution of the survey, the optimum track, based on tidal or other currents, can be adjusted based on the actual positions realized along the survey line. A no-change scenario occurs when the actual trajectory realized is within the limits set for the planned track. The no-change corridor limits will be derived from both the error estimates associated with the combined source and receiver position estimates and the steering constraints thought to give the optimum result. This check can occur for each cycle of the transform function.

If the trajectory falls outside the no-change corridor, then a correction is required and the process shifts to the next stage. This next stage is to reoccupy the no change corridor or some other corridor, perhaps narrower, but centered within the no-change corridor. An example of a methodology for keeping within the no-change corridor is through PID control of the spread control elements. If the no-change scenario is achieved, then analysis is made of the way the scenario is changing towards the limits to discover whether a correction would then be desirable. The ideal solution is a scenario that remains mid-way between the acceptable tolerance limits.

Transform Function Summary

Simply stated, the primary role of the transform function 121 is to take all the available input data 110 and transform them into the necessary drive commands for all the spread control elements to achieve a selected survey objective. While there may be several possible solutions to achieve a near-instantaneous conformance to the requirements, the transform function will calculate the solution set as it is projected into the future to ensure that steering commands made now will not cause unwanted effects for a time in the future. This time may, for example, be the time duration for the entire spread to pass over a given location. During each cycle, the inputs are put to the transform function 121 which re-evaluates the current operating states and any need for a new, optimal set of operating states, including but not limited to steering commands, and computes adjustments as necessary.

Calibration

As mentioned above, the spread model 123 is preferably calibrated using spread model parameter estimates based on the predicted residuals and/or measured behavior, which are based on the navigation data 112. Calibration thus takes advantage of available measured outcomes, such as positions obtained or estimated using another method such as acoustic networks or GPS, to train the spread model before and after any individual or sequence of uncalibrated transform function cycle(s).

The calibrating step preferably includes minimizing the difference between the predicted residuals, by estimating spread model parameters that result in agreement with the position estimate. In this manner, it's possible to feedback positioning quality information so that the accuracy of the spread control components that contribute to the position prediction process may be improved upon. Spread control model parameters that might be calibrated include, towed body drag coefficients, lift coefficients, current meter error, wind meter errors, operating state biases. Calibrating these parameters will narrow the difference between track (pre-designated) and trajectory (actual) coordinates.

The minimization can be achieved by relating the hydrodynamic or other model type parameters mathematically to the observations that drive the model. Current force in the sea and wind force on the sea surface are the ambient or natural force regime while mechanical counter forces generated by the spread control elements are used to position the spread optimally.

An example of spread behavior calibration through measured performance is achieved steered feather. Given the range of demanded side forces from the SSDs 38, a range of steered feather angles can be measured as an outcome. This outcome will be unique to the local current regime and the spread under tow. Various streamer-steered feather angles can be predicted and achieved as they were in the recent past, and thus the SSD response is calibrated. Similarly, the time taken to achieve various steered feathers can be measured and used to predict the feather change required to achieve optimum streamer target shapes.

The range of demanded side forces possible from any of the spread control elements is limited, especially in the framework of normal data acquisition, (nearly straight tow). For this reason, only a small subset of the total function that describes the temporal and spatial response of the total system is needed for prediction of the small incremental changes demanded under normal operation.

Alternatively, the mathematical model fitting may employ a pure stochastic model of the spread components. Other examples of the mathematical model fitting steps may include one of the L-norm fitting criteria, PID controller, Kalman filter, or a neural network, or any combination of these.

System

In another aspect, the present invention provides a system for controlling the seismic survey spread 10. The system is preferably located onboard the vessel 11, but those skilled in the art will appreciate that one or more components may be located elsewhere such as another vessel or on shore, as in remote monitoring of a survey from a shore based office, that includes some or all of the transform function computations, depending on the data transfer rates available. The system includes a database for receiving the input data 110, and a set of computer-readable medium(s) having computer-executable instructions that collectively make up the transform function 121 as described herein. Thus, a first computer-readable medium has computer-executable instructions for estimating the positions of the sources 16 and receivers 21 using the navigation data 112, the operating states 116, and the environmental data 118. A second computer-readable medium has computer-executable instructions for determining optimum tracks for the sources 16 and receivers 21 using a portion of the input data 110 that includes at least the survey design data 120. A third computer-readable medium has computer-executable instructions for calculating drive commands for at least two of the spread control elements using at least one the determined optimum tracks. These computer-readable mediums may be combined or consolidated in a manner that is well known in the art, such as by placing the respective computer-executable instructions on a single compact disk. The drive commands preferably account for time delays in the response of the spread 10, as previously described.

Validation

An important component of the inventive spread control system is independent validation (steps 127, 128) of the optimum tracks calculated at step 124 and the drive commands calculated at step 126. Validation is important for several reasons, including:
1. to ensure the safety of the vessel 11 and other vessels in the neighborhood;
2. to ensure that the spread control elements are operated within manufacturers' tolerances; and
3. to ensure that individual failures are prevented from propagating into costly equipment loss or damage.

Validation occurs at several levels and modes of the operation. The various levels of validation include:
1. internal consistency of optimum track for all spread elements within the spread 10;
   a. predicted position changes within spread relative proximity limit?
   b. predicted velocity changes within spread relative velocity limit?
   c. predicted position changes within obstruction proximity limit?
   d. predicted velocity changes within obstruction relative velocity limit?
   e. predicted resultant tension within allowed tension limits?
2. drive command parameters to be within limits appropriate for particular modes of operation;
   a. predicted resultant tension within allowed tension limits?
   b. all deflector angles of attack within stall limits?
   c. all wing angles of attack within stall limits?
   d. all vessel control apparatus within limits to restrict heading change?
3. drive commands sent to devices with a high degree of coupling to be checked for antagonism (for example, steering adjacent streamers towards each other when they are already too close).

The modes of operation taken into account include:
1. straight-line production—characterized by low rates-of-change of drive command parameters;
2. non-straight-line production—characterized by medium rates-of-change;
3. turn during non-production—characterized by higher rates-of-change;
4. deployment—characterized by high rates-of-change and some limits not being observed; and
5. emergency—characterized by the fewest controls on drive command parameters.

Validation further includes the checking of system limits, such as:
1. spread control element control limits not exceeded—for example, end-stops on rudder;
2. environment sensor limits not exceeded—for example, towing tension, diving streamer in shallow area;
3. rate of response to spread control element control setting changes—for example, a steering change may have little effect on a vessel if the wind is opposing it, but a large effect if the wind is assisting it; and
4. position of a spread component not outside an acceptable area (or inside an unacceptable one).

In normal operation, the validation will allow the checked control settings to proceed to the respective spread control element controller after positive validation. If the request is rejected, a warning message is sent to the Operator and the request is blocked. The Operator would then take overriding action as necessary to control and correct the situation.

Minimum Coupling Model Example

A particular embodiment of the present invention that employs a hydrodynamic model within the transform function will now be described with reference to FIGS. 3-13. The spread control elements will be controlled as independently as possible, or can be coordinated manually by an operator. Within the vessel reference frame, the spread control elements are treated as independently as possible. In another embodiment of the invention, all spread control elements are controlled by a highly integrated control system with a comprehensive coupled model.

Vessel Steering

The role vessel steering plays in spread control is to position the towpoints for the towed spread bodies such that they can maneuver into an optimum position for each seismic shot. The reactive characteristics of a survey vessel (i.e., its performance specifications) must be part of the algorithm that plans the vessel steering. When computing the distance into the future to project the vessel path, knowledge of forces that will be encountered by the vessel 11 along this future path must be considered.

The amount of steering needed to control source and receiver positions can be influenced by the base survey. If the base survey was conducted to optimize coverage, current forces with a cross-line component may have caused the spread to oscillate along the shooting line. Especially in conventional survey configurations, vessel steering is the most usual method to reduce infill. If, however, the base survey was conducted to optimize the probability of successfully repeating the same seismic energy ray paths in future surveys, the vessel might have steered straight along the pre-plot line.

Depending on the survey objective, one or more of the spread components should occupy a target space along the survey line. The vessel path that will allow this can be computed using a best-cost map method as described by U.S. Pat. No. 6,629,037. This method is further developed below.

Decoupling the Spread Control Elements from Each Other

As stated above, within the vessel reference frame, cross-line forces can be exerted by the spread control elements being towed. Thus, the vessel must be looked at as being coupled to the towed spread, but the spread control elements can be looked at as if they are independent within the vessel reference frame. The coupling to the vessel will be weighted for one or more of the towed spread elements, depending on the objective of the system. Decoupling of the spread control elements within the spread control model is presently believed to provide the best solution (although others exist) for determining how the elements interact and influence the vessel trajectory.

If the spread control elements can control the spread 10 adequately to meet the positioning objectives with no cross-line contribution from the vessel 11, the spread control elements are, to a large degree, practically and conceptually decoupled from the vessel.

The Source Array

The inline motion of the source arrays 16 is determined by the vessel 11. The distance cross-line the source arrays can travel is constrained by the towing configuration (e.g., ropes or lead-ins 20). If the source arrays can be steered within this cross-line constraint corridor, and the target is within this corridor, optimum source positioning can be achieved. Several mechanisms for positioning within this corridor are possible. These include:
1. extra parallel gun strings that can be dynamically combined to give the source array according to their proximity to the desired cross-line position;
2. winch systems that control the towing configuration relative to outer streamer tow ropes; and
3. deflectors on the source array with controllable angles of attack.

By these mechanisms, the source position can be steered cross-line to get the best possible position with, depending on the mechanism in use, little or no regard for any other spread control element. This assumes the vessel 11 hasn't deviated cross-line from the pre-plot line by more than the source steering devices 17 can correct for, (i.e., is decoupled) and the cross-line forces on the source arrays 16 can be countered by the steering device 17 in use.

Steerable Streamer Front End Deflector (SFED)

The SFED 22 developed for time-lapse applications can drive the front end of the streamers 18 cross-line. Depending on the length of the lead in cables 20, cross-line motion will change the inline component of the individual streamers, giving a skew to the collective front end, commonly called streamer front end skew. Here there is a coupling between inline and cross-line, but it's slight.

There are several reasons for steering the front end of the streamers 18. One is to prevent the outer streamer front ends from rotating, (front end skew). One of the most evident causes of front end skew is vessel steering. Also, SFED steering can be used to shift the front of the streamers cross-line. Finally, SFEDs control streamer separation. All of these steering objectives contribute to positioning the streamer front end, which is the reference point for the streamer steering algorithm described below.

Streamer Steering Devices (SSDs)

The SSD global controller has several modes with the objective to deliver a demanded individual or collective streamer shape. Constant feather and constant separation are two examples.

Feather Mode

Figure 3:
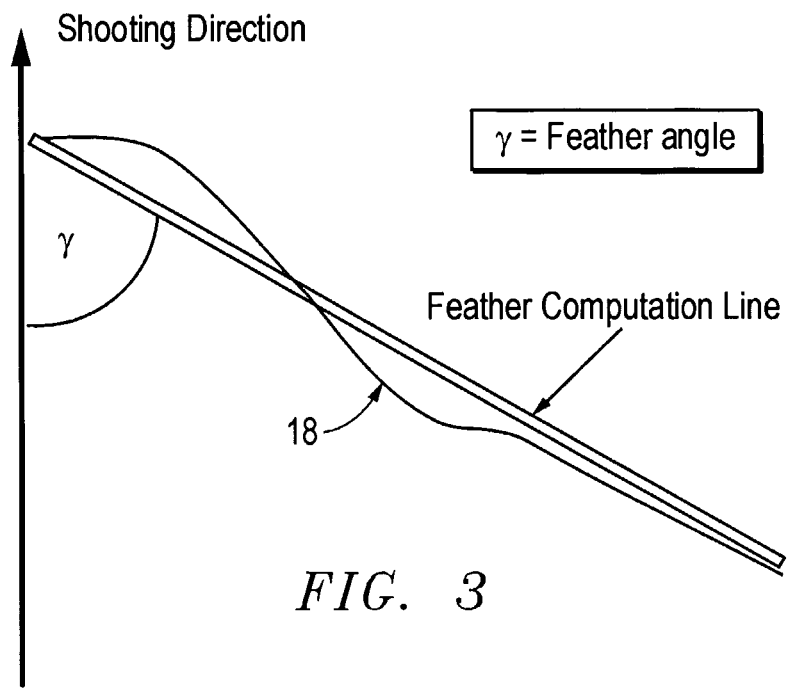
FIG. 3 is a schematic representation of a towed streamer exhibiting a constant feather.

In feather mode, the SSD global controller uses the front end of the streamer as a reference point (srp), effectively an origin, from which an ideal streamer shape is computed relative to some reference direction, for example, the pre-plot line direction. One case of this shape is a streamer 18 with constant feather, i.e., substantially the entire streamer has the same feather as seen in FIG. 3. Thus a desired feather of zero degrees is obtained by steering towards a virtual streamer computed by extending a straight back from the front reference point of the streamer and parallel to some reference direction like the pre-plot line direction.

Here is a coupling or cooperation between the SFED and the SSD global controller. As stated above, steering to get the correct reference point for the streamer front end is another objective of SFED steering.

Constant Separation Mode

Figure 4:
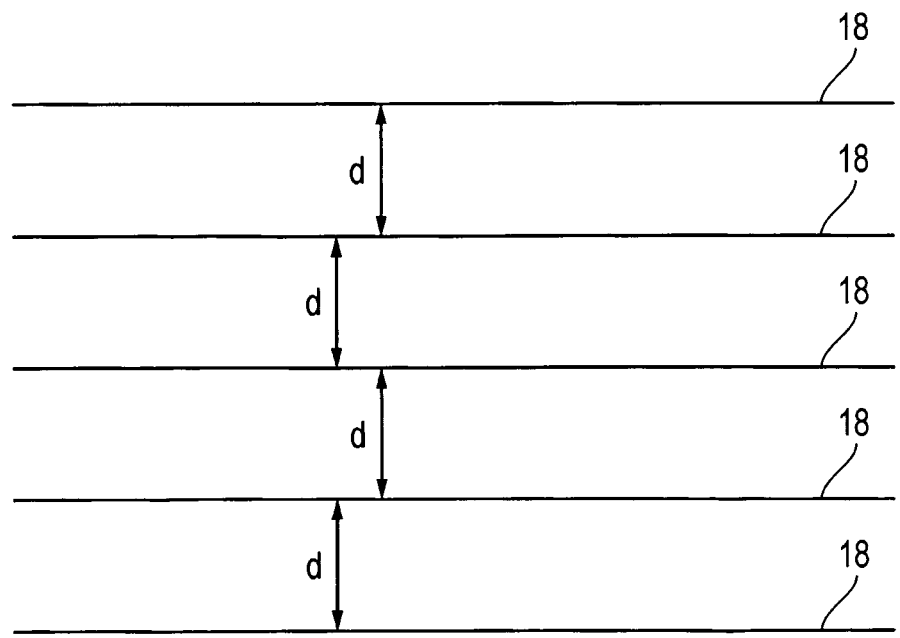
FIG. 4 is a schematic representation of a plurality of streamers exhibiting a constant separation mode.
Figure 5:
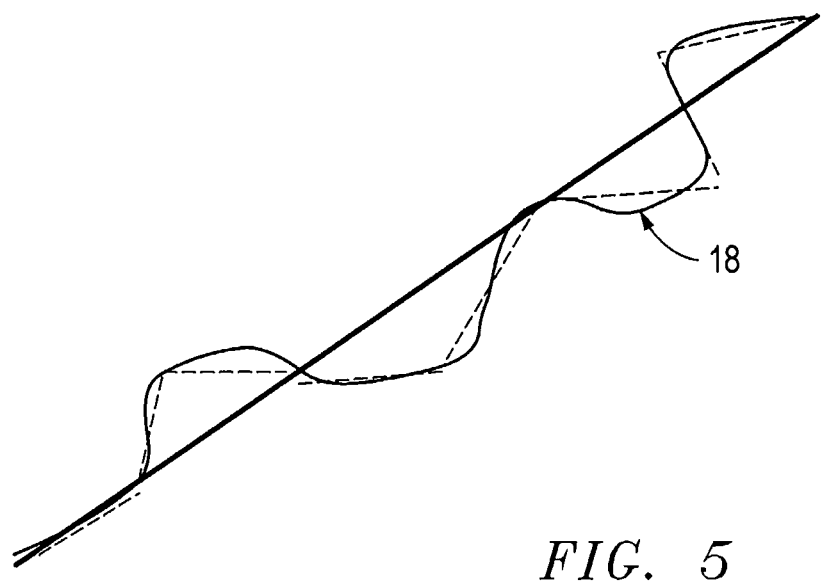
FIG. 5 is a schematic representation of optimum streamer shape modeling with local feather angles defined by segments along the streamer to achieve a best fit for a prior streamer survey shape.

This mode, shown in FIG. 4, functions by comparing the distance from the SSD on the adjacent streamer to the desired separation. The SSDs function to keep all streamers a user-entered distance apart. During periods of skew, the cross-line component of the distance is resolved for comparison.

Limits to Steering

Anticipation of the forces ahead, particularly the cross-line forces due to currents, will dictate what drive commands (e.g., steering) give the best outcome. However, steering the spread control elements may not overcome all cross-line forces the spread might encounter. When the steering limit of the spread is reached, the transform function 121 optimizes the shape of the spread 10 to fit the survey objective(s). The optimal streamer shape might be straight with a desired feather angle (see e.g., FIG. 3), it might have local feather angles defined by segments along the streamer to achieve a best fit for a prior streamer survey shape (see, e.g., FIG. 5), or the streamers might be evenly spaced (see, e.g., FIG. 4) to allow better trace interpolation in the seismic data processing step.

Current Model within the Transform Function

Figure 9:
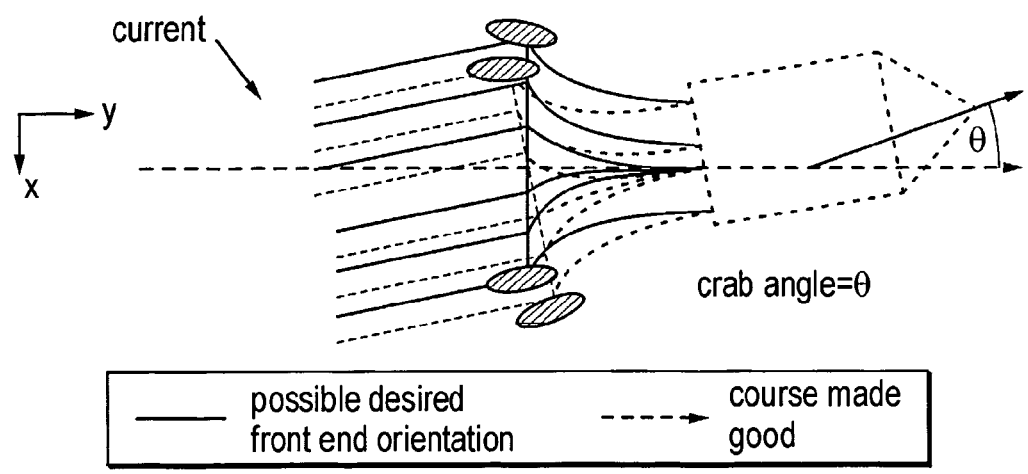
FIG. 9 is a schematic representation of a correction or change in streamer front end that results in the streamer front end being offset at an angle to the course made good, in order to overcome a current-induced crab angle θ.

The same simple current model described for the source array feather and illustrated in FIG. 9 also applies to the streamers 18. As long as the current is constant to some degree over the length of the streamer, the same model and accompanying ability to predict future natural feather angles is valid. The calibrated spread model ability to achieve steered feather can be added to the natural feather to get a desired streamer shape.

Force Model within the Transform Function

Desirable hydrodynamic force models may be derived from the teachings of: P. P. Krail and H. Brys, "The Shape of a Marine Streamer in a Cross-Current", Vol. 54, No. 3 of the Journal of the Society of Exploitation Geophysicists; Ann P Dowling, "The Dynamics of Towed Flexible Cylinders," Part 1: Neutrally Buoyant Elements, and Part 2: Negatively Buoyant Elements, 187 Journal of Fluid Mechanics pp. 507-532, 533-571 (1988); C. M. Ablow and S. Schechter, "Numerical Simulation of Undersea Cable Dynamics," Ocean Engineering, 10: 443-457 (1983). The algorithms used to predict the streamer behavior within the transform function are based on these teachings and give a significant improvement to streamer behavioral prediction when combined with models of spread control elements coupled with the streamer. An example of a commercial implementation of streamer cable shapes resulting from the above-referenced force model theory, and including SSDs, is Orcina's OrcaFlex™ cable modeling software.

Track Optimization Formulas

These formulas are based on optimizing the differences between desired and actual positions and/or shapes along a shooting line for the individual spread bodies, and assume decoupling as described above. One of the salient constraints is the reaction time of the various steering devices. Reaction times can be measured with any frequency, depending on the navigation solution rate. Reaction times are practically on the order of the shots, i.e., typically tens of seconds. The steering control will thus plan several shots ahead and is likely to be vessel and spread dependent.

Further, in the calibration computations, spread control elements reaction times, will be estimated based on the recent history of reaction times, learned from the navigation data input 112. These reaction time estimates for various spread control elements will then be used in the optimum track estimation 124 to facilitate the calculation of realistic drive commands (at 126).

Vessel Trajectory

The vessel path can be planned to keep the tow point for the towed spread control elements within the constraint corridor that allows the steering available in the spread to achieve the target shape and track. Thus given a particular desired shape that can be achieved by the towed spread control elements, an optimum track for the towpoints is estimated that gives an adequate cross-line component relative to the optimum track for the towed spread. The optimum track for the towed spread is derived from the objective of the present phase of the operation. It may be a time lapse survey and the objective might be for a certain offset group to reoccupy the same track as it did in the base survey. It might be close pass of a production platform and the objective is for the closest towed object, the streamer end for example, to keep a distance of 50 meters from the platform. With this track realized, the towed spread is decoupled in the sense that it can maneuver adequately within the vessel reference frame.

The algorithm that allows this towpoint track is a best-cost map method as described by U.S. Pat. No. 6,629,037. Here a particular element of the spread, an offset group of the streamers or the center of the source array for example, is given a higher weight in the best track search for the vessel. The coupling model can be for example a straight line between the vessel towpoint and the highly weighted spread element(s), and will be as accurate as the ability of the spread control system to realize that shape. The goal of the vessel towpoint track estimate will be to give the cross-line shift between the towpoint and the critical spread element(s). The track can be recomputed as often as the computational power available will allow. The re-computation of the track may not be required at a high frequency since the vessel towpoint in the area relative reference frame, and towed spread element relative to the vessel towpoint, change slowly in the cross-line direction during a typical survey.

This track estimate can be computed in the planning stage with a pre-survey estimate of spread body steered feather and survey objective spread target set. This planned track can be used in the algorithm following to anticipate the amount of steering that might be required for a particular survey.

Once the track is computed, with a start point at the present vessel towpoint position, a plan for realizing this track is computed. Here the response time of the vessel is the limiting factor. The best cost computed track must be realized in a stable way that minimizes over-steering.

Figure 6:
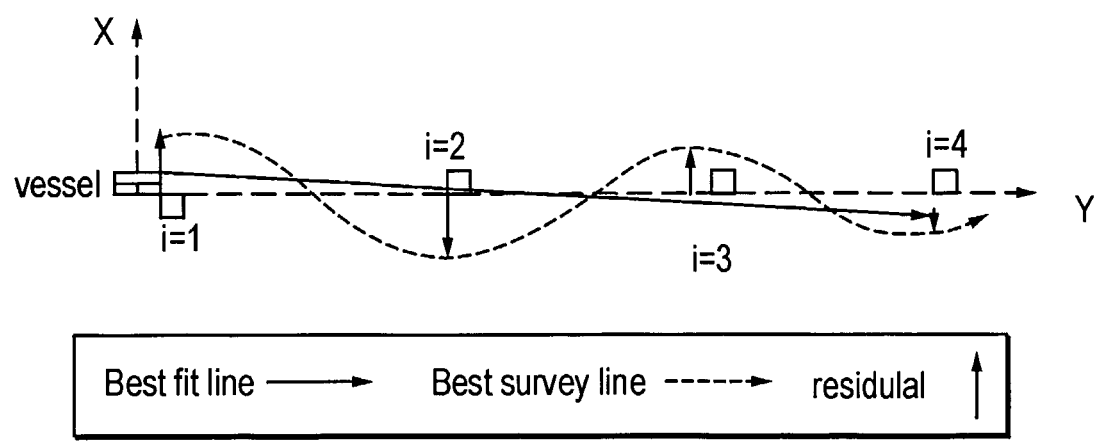
FIG. 6 is a schematic representation of a best-fit straight line according to a look-ahead projection of four shot points, wherein the residual projections are recomputed based on the location after each shot point.

A smooth vessel track to occupy the optimum track can be computed with the following algorithm. The area relative coordinate frame is used for this development. In this reference frame, y is the inline axis and x is the cross-line axis. Thus:

$$\Delta Ves_x = X_{spi} - X_{spi+n} \qquad \text{Eqn 2}$$

$$\Delta Ves_y = Y_{spi} - Y_{spi+n} \qquad \text{Eqn 3}$$

where:
$sp_i$ is shotpoint number i.
$sp_{i+n}$ is shotpoint number i plus n shots into the future.
$\Delta Ves_x$ is the difference between the current vessel crossline coordinate and the crossline coordinate n shots ahead from the previous survey.
$\Delta Ves_y$ is the shotpoint distance
The steering model as shown in FIG. 6 is a straight line:

$$(\Delta Ves_x)_{steered} = m(\Delta Ves_y)_{steered} + \beta \qquad \text{Eqn 4}$$

where:
m is the estimated slope or crossline change to steer toward with inline motion.
$\beta$ is the current crossline coordinate.
The steering plan is based on the best fit line to the best cost track estimate described above. The observation equations are written in matrix notation:

$$A_x = b + v \qquad \text{Eqn 5}$$

where:

$$A = \begin{bmatrix} 1 \\ 1 \\ 1 \\ 1 \end{bmatrix} \qquad \text{Eqn 6}$$

x=m, the slope estimate
b=$(\Delta Ves_x / \Delta Ves_y)$ measured
v the residual of the fit.
The least-squares solution to this equation can be written:

$$x = (A^t A)^{-1} A^t b \qquad \text{Eqn 7}$$

The simple A matrix shown above will have more significance in the weighted solution. The example shown projects four shot points forward, as represented by the four observation equations indicated in the A matrix.

In order to constrain the amount of steering caused by one or more future shot points that were the result of poor steering and not indicative of the trend, we can introduce dynamic weighting. The weighted L2 solution is written:

$$x = (A^t P A)^{-1} A^t P b \qquad \text{Eqn 8}$$

where:

$$P = \begin{bmatrix} P_{ii} & 0 & 0 & 0 \\ 0 & P_{ii} & 0 & 0 \\ 0 & 0 & P_{ii} & 0 \\ 0 & 0 & 0 & P_{ii} \end{bmatrix} \qquad \text{Eqn 9}$$

at iteration (ii=1).
The residuals are computed from iteration (ii=1) with:

$$v_{(ii=1)} = Ax - b \qquad \text{Eqn 10}$$

Each individual residual is compared with the standard deviation of all the residuals. The largest residual that is also greater than a limit that would cause excessive heading changes: $|v|_{ii} > 2\sigma_{ii}$ for example, can be downweighted as some function of the residual and the line fit again with:

$$P_{(ii+1)} = f(|v|) \text{ if } |v|_{ii} > 2\sigma_{ii} \qquad \text{Eqn 11}$$

and $$P_{(ii+1)} = P_{ii} \text{ if } |v|_{ii} < 2\sigma_{ii} \qquad \text{Eqn 12}$$

Re-weightings continue until the heading change is acceptable to the objectives set for the towed spread control objects.

Alternatively, the value n can be increased until the long-term trend gives a heading change that is acceptable. A minimum number, depending on the vessel response possible, is used. If the resulting heading change is larger than the limit, the line can be recomputed based on a best fit for n+1 and so on until the heading change is below the limit.

This computation of vessel track is repeated for each shot cycle based on the actual position occupied at shot time. In a pre-survey application, the position for each shot is taken to be the position that would have been reached after traveling along the straight line until the next shot location was reached. At each shot a new line, giving a new heading is followed.

Studying the best steering strategy pre-survey, in the planning stage, will allow a better understanding of how far ahead to extend the line fit through trial and error. In addition, it will give the navigator an idea of the approximate steering they might encounter. It can then be recomputed online to give the steering required in situ, but with constraints and difficult periods identified in the survey design phase.

The maximum heading change will be determined by a number of considerations including;
1. the ability of the vessel 11 to move the tow points of the spread elements cross-line;
2. towed spread ability to move cross-line in one shot (one spread control element will limit the rest);
3. weighting based on how many shots will be out of spec (i.e., will deviate from the optimal track) with longer look ahead projections;
4. the value of the zone of the survey, where some areas or zones of the total survey area might by less interesting than others due to the subsurface targets believed to exist there; and 5. spread element weighting, the re-computation of the best cost track The normal vessel shooting speed gives adequate device-relative water flow to operate passive steering devices such as SFEDs. Forces resulting from changes in the towed spread control elements must not have a significant impact on the vessel heading. As an example consider a rapidly changing significantly different tension from port to starboard towpoints that could cause the vessel to crab. Thus tension should be monitored at the towpoints to assure it's not excessive and also in balance in relation to the vessel.

FIG. 6 illustrates a best-fit straight line according to a look-ahead projection of 4 shot points, wherein the residual projections are recomputed based on the location after each shot point. The number of shots in the future that define the line determine how drastic the steering will be, with one shot point being the most drastic.

Figure 7:
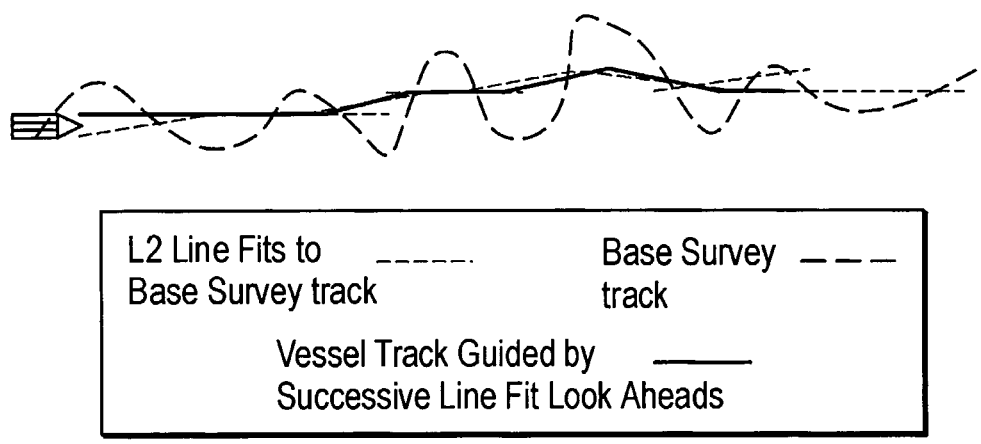
FIG. 7 is a schematic representation of a combination of successive look-ahead best-fit straight lines like that of FIG. 6.

FIG. 7 shows a combination of successive look-ahead best-fit straight lines like that of FIG. 6. The resulting segmented look-ahead path is a smoother, and more realistic, vessel trajectory compared to the prior survey line. Those skilled in art will appreciate that the above-described straight line path is but one model that may be used to advantage in accordance with the present invention.

The Source

The behavior of the source arrays can be measured as a function of a heading change. The source arrays largely follow the vessel track but can also be shifted cross-line by current and, to a lesser degree, wind. A source steering device 17 can only compensate by a limited amount for cross-line shifts. Once the steering limit is exceeded, vessel steering is the only tool left to put the source in the desired position.

Source Calibration for Steering

With a calibrated model of source array behavior relative to the vessel 11, the source array position can be predicted relative to the vessel along a survey line. Factors that can be added to the prediction model are expected currents and wind along the line.

Measures of inline and cross-line change are provided by GPS receivers on the source array floats. The locating of GPS receivers on the source array gives the rate of change in gun string array coordinates with respect to heading changes. For each new vessel heading, the time and trajectory taken by the source array 16 before it stabilizes behind the vessel 11 is the measure of the system reaction.

Current Effect on Source Array and Current Calibration

In addition to the effect of vessel heading changes, source behavior due to any other relevant force such as wind, can be measured. A current-induced source cross-line shift can be expressed in terms of source feather angle and described by the simple comparison illustrated in FIGS. 8A and 8B. The resultant from the vessel movement and the water current vectors in the area relative reference frame gives the source feather angle. Thus given the value of R (the distance from the source tow point on the vessel to any point on the gun string), and the feather angle, the source array coordinates can be predicted. Since the relation between feather angle and current is known, in the absence of significant cross-line wind, measured feather angle gives the current direction and can be used to calibrate any source of current information.

Figure 8A:
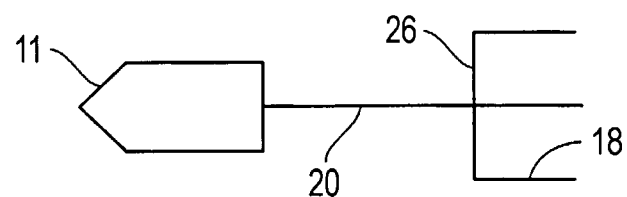
FIGS. 8A-8B are schematic representations illustrating how a current-induced source cross-line shift can be expressed in terms of source feather angle, and current and vessel-velocity vector resolutions.
Figure 8B:
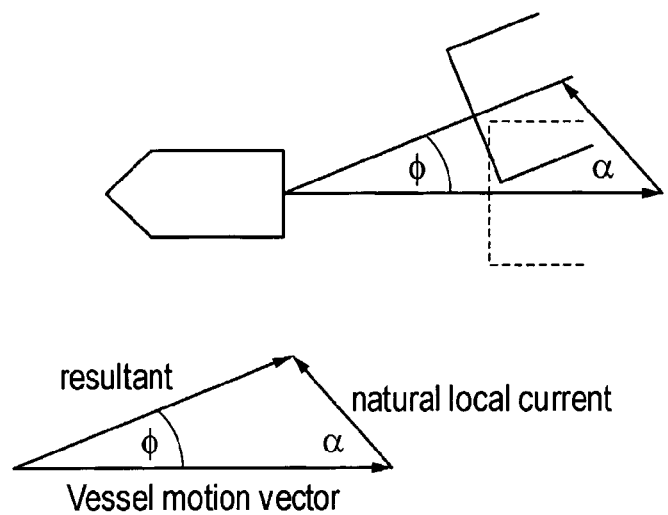

FIG. 8B shows a schematic representation of current and vessel velocity vector resolution. Air currents with a cross-line component, wind, against the gun array surface floats will shift the source array cross-line if the force exerted is large enough. In order to estimate the cross-line displacement, an aerodynamic model of the float surface area must be used.

SFEDs

The SFEDs can react to the position estimates of the streamer head reference points as they are used today to drive SSD feather mode in the global controller. The SFEDs' expected proximity to the pre-plot or base survey coordinates based on estimated vessel tow point position will be the basis for calculating the SFED drive (steering) commands. The SFEDs' objective will be to drive the head of the streamers into the optimum position to allow the SSDs to locate the streamer length optimally. In addition, the SFEDs should stabilize the front end of the streamers, which is especially important for the SSDs in feather mode since the feather is computed from the front end reference point.

As with vessel steering, drive commands are based on reaction time of the SFEDs. SFED reaction time will be measured continually during the survey and fed back to the transform function to gauge the look-ahead period. The same model as described above for vessel steering—a straight line fit some number of shot points ahead—is an example of how drive commands can be computed for the SFEDs.

A nominal orientation, perpendicular to the pre-plot for example, might be the desired orientation of the spread during the base survey. A recording of the base survey orientation containing each shot of the base survey is replayed during the repeat survey to give the SFED target orientation. In addition to orientation, cross-line positioning can be achieved by the SFED.

Base survey positions for the streamer front ends will be used to determine what streamer front end orientation gives the optimum repeat positions. Repeat or time lapse survey spreads may have the same number or more streamers than the base survey. Time lapse spreads may have the same or denser streamer separation distances as well. In all cases, the objective would be to match streamer front end coordinates in cross-line and inline positions.

FIG. 9 shows a correction or change in streamer front end by the execution of drive commands delivered to the SFEDs. The correction results in the streamer front end being offset at an angle to the course made good, overcoming the current-induced crab angle $\theta$.

Figure 10:
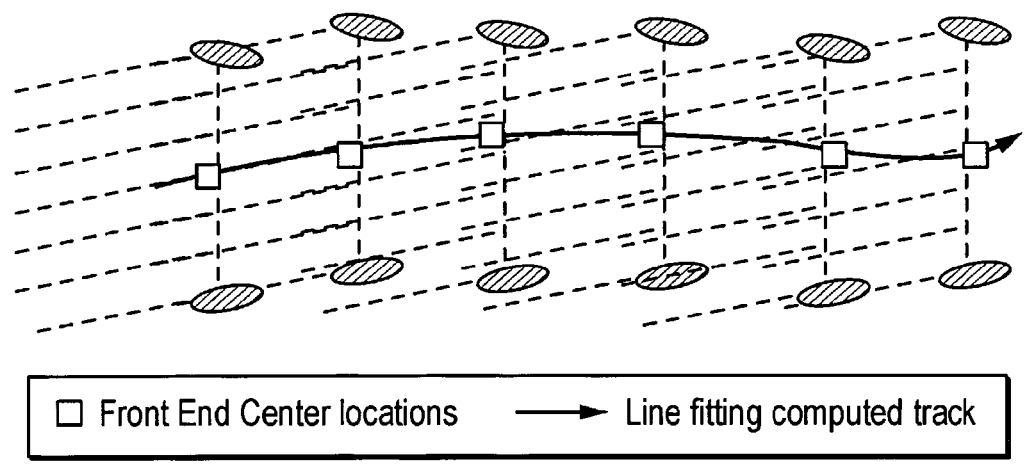
FIG. 10 schematically shows the streamer front end centers being fitted to a desired steering track.

In addition to orientation, a mean cross-line coordinate, in the vessel relative coordinate frame can be computed for steering purposes. This means the streamer front end can be used as a target. Accordingly, FIG. 10 shows the streamer front end centers being fitted to a desired steering track.

The behavior of the spread front end with respect to the vessel heading can be estimated in a similar way as was described above for the source array. The rotation of the tow points can be either measured directly by locating GPS antennas on them or indirectly through the change in the streamer front end coordinate estimate change as a function of vessel heading changes. As in the case of the source array, current larger than the SFED ability to steer will drive the front end out of equilibrium. Further, the SSDs can assist the SFEDs by anticipating the change in the vessel heading and the estimate of impact caused by the change of heading on the streamer front end.

Steerable Tailbuoys

Since the streamers are not controlled after the last SSD, the tailbuoys will be useful to bring the tail ends into place. Positioning in feather mode will be the continuation of the straight feather line made by the SSDs, parallel to the full length of the streamer. To obtain long offsets, steerable tailbuoys will be useful to get the tail end of the streamer on target.

Optimal Feather Angle Estimation

Decoupling of the source array track, and assuming a straight streamer, fitting a line to the set of coordinates occupied by the previous receivers along a streamer is a solution that decouples the source control from the streamer control. The vessel and SFEDs will cooperate to get the streamer front end, called the streamer reference point (srp), into position. Both in pre-survey planning and real time, the coordinate prediction of the srp's will be used by the global controller as the start point of the streamer. From this predicted streamer start point, a straight line least squares fit to the targets along the base survey streamers can be computed for each shot. This fit will give an optimum matching streamer feather angle.

A global or individual feather angle can be computed for the streamers. The global controller will instruct the SSDs to assume this feather angle for steering. The feather angles demanded must not change more rapidly from one shot to the next than a specified limit. This can be limited as in the straight line fit for the vessel trajectory by isolating the target(s) responsible for any demand in rapid feather angle change. This computation can be done pre-survey and the feather angle speed limited, or in other words, the outlier shots downweighted.

Optimal Feather Angle for all Streamers

The optimal feather angle can be computed based on the base survey coordinates. Again the quantities driving the optimal feather angle changes demanded by the transform function are the residuals formed by differencing the actual and desired receiver coordinates.

For each shot, given the predicted coordinates of the srp, there is a line that starts at srp(x,y) and is projected sternwards a distance $R_{str}$ equal to the streamer length, at some feather angle with respect to a reference direction such as the shooting direction, that fits best in some sense, (such as least squares) the set of receiver coordinates that are to be reoccupied during a time-lapse survey.

Figure 11:
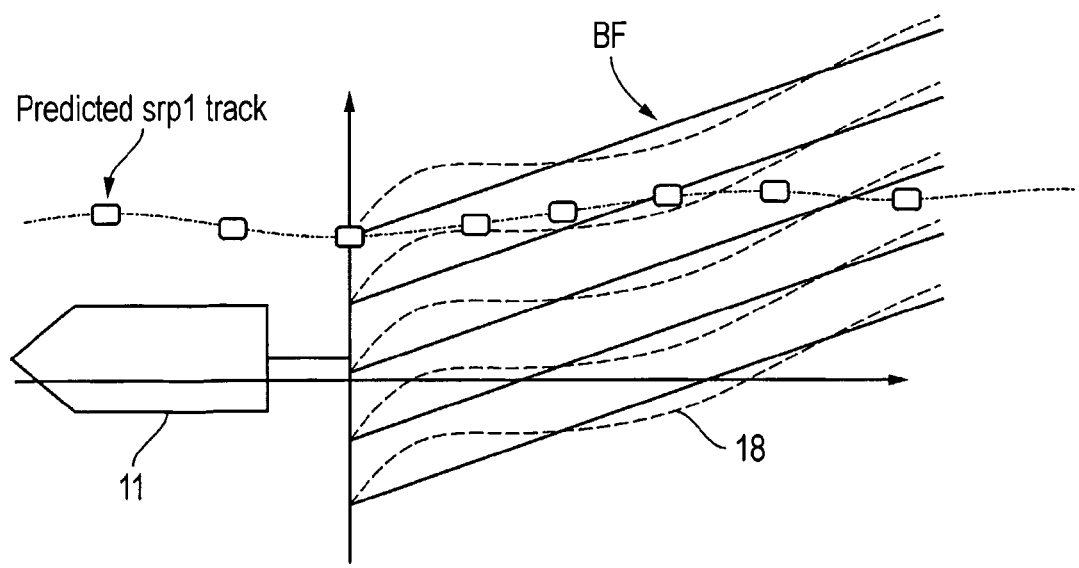
FIGS. 11 and 12 schematically illustrate how "best fitting" lines for base survey streamers that have common slopes can be estimated and converted to a common feather angle for all streamers at each shot.
Figure 12:
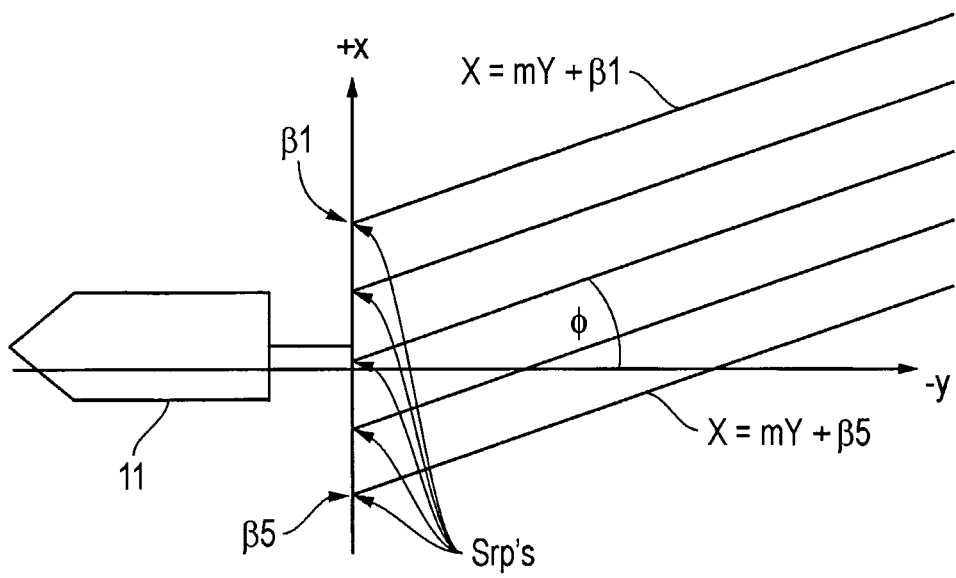

The vertical axis is perpendicular to the reference directions, and the srp's are on this line. The horizontal axis for convenience passes through the vessel reference point, located mid vessel, and is not related to the vessel heading except when the vessel is perfectly parallel with reference direction, the shooting direction for example. The origin is at the intersection of the two axes. All srp's can be normalized to the system origin to form an observation equation that gives a common slope. As illustrated in FIGS. 11 and 12, the common slope of the "best fitting" lines BF for all base survey streamers 18 can be estimated and converted to a common feather angle Φ for all streamers at each shot. The srp's will give the y intercepts for these lines.

The conversion from slope to feather angle is the conversion from Cartesian to polar coordinates. If for any Rec (x,y) pair on the best fit lines, x/y=m, then:

$$\text{Arctan}(m) = \text{feather angle.} \qquad \text{Eqn 13}$$

For any receiver i ($Rec_i(x,y)$) on any streamer j, given an along distance relative to some common origin, a cross line value, normalized by the cross line component of the srp for that streamer, an observation can be formed to yield a slope.

$$m_i = (x_i - b_j)/y_i \qquad \text{Eqn 14}$$

These observations can be formulated to give the observation equations as shown in Equation. 5, (i.e., Ax=b+v) where the number of observation equations is equal to the number of receivers on all streamers, n=(j*i).

$$A = \begin{bmatrix} 1 \\ 1 \\ 1 \\ \vdots \\ n \end{bmatrix}, x = m, b = \begin{bmatrix} (x_i - b_1)/y_1 \\ (x_2 - b_1)/y_2 \\ (x_3 - b_1)/y_3 \\ \vdots \\ (x_i - b_1)/y_i \\ (x_i - b_2)/y_i \\ (x_2 - b_2)/y_2 \\ \vdots \\ (x_i - b_2)/y_i \\ \vdots \\ (x_i - b_j)/y_1 \\ (x_2 - b_j)/y_2 \\ \vdots \\ (x_i - b_j)/y_i \end{bmatrix}, \text{ and } v = \begin{bmatrix} x_1 - \hat{x}_1 \\ x_2 - \hat{x}_2 \\ x_3 - \hat{x}_3 \\ \vdots \\ x_n - \hat{x}_n \end{bmatrix}.$$

The simple solution to Equation 6 is also Equation 8, and the weighted least-squares solution is Equation 9.

Again, as in Equation 9, the slope and thus feather angle change can be constrained by downweighting very large observations values. Further, the slope estimate can be constrained to favor any offset group by giving that group a higher weight relative to less important offset groups.

The application of this estimation is advantageous for reducing infill in a near real-time situation along straight pre-plot lines where currents are present, but is perhaps most useful for reoccupying receiver positions shot on a previous survey where there was difficulty obtaining coverage by following the straight pre-plot line. While it's not currently common practice for the srp's to follow a non-straight pre-plot line in favor of a track that gives the best repeat positions, (i.e., time lapse surveying), this estimation process will make repeating receiver positions easier.

Optimal Feather Angle for Individual Streamers

Figure 13:
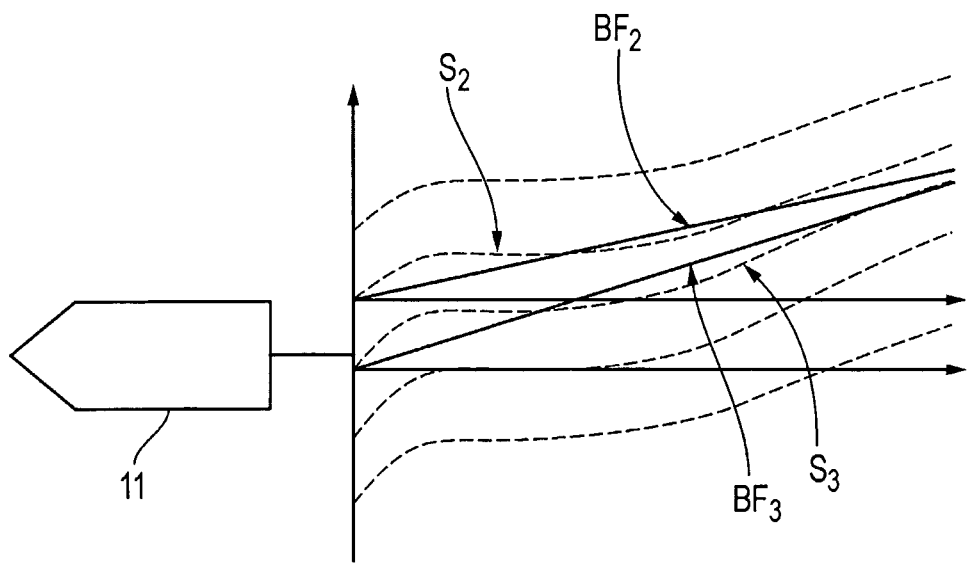
FIG. 13 schematically illustrates the principal of FIGS. 11-12 being applied to estimating an optimum slope for individual streamers.

FIG. 13 illustrates that the above-described estimation of the optimum slope and thus feather for all streamers is applicable for estimating an optimum slope for individual streamers 18 (see best fit lines $BF_1$ and $BF_2$ for streamers $S_1$ and $S_2$). Optimizing the slope with a "best fit" line for each individual streamer has the advantage of giving a better fit to the base survey receiver coordinates. This advantage brings with it some level of complication in that the feather angle from streamer to streamer can not be too different before the risk of collision occurs. Since streamers should not become dangerously non-parallel even without the aid of steering devices in a conventional spread, it reasonable to predict that the risk will be infrequent.

The simplest way to deal with the risk is simply to use the estimated change in feather for the individual streamers to give the relative proximity and velocity those changes will give. If predefined limits are exceeded, some weighting criteria for coordinating the individual feathers is needed. Since the base survey coordinates can be made available known before the real time danger is encountered, situations likely to approach the risk avoidance limit can be managed before the risk is encountered. In addition, software checks in real time are used to eliminate the risk of streamer collision due to conflicting feather angles for individual streamers.

Current and Wind

In this discussion the use of the term "natural feather" is to characterize the combined effect of current and wind on surface objects to move them cross-line. Vessel heading, source array feather, and tail-buoy feather, in the absence of cross-line steering, occur due to surface current and wind (swell also). When these long period motions are observed in the position estimates, a trend is identified. If the trend is spatially short in relation to the spread extent, a local trend is identified and can be anticipated by the spread control elements following. If the trend is persistent in time, it can be remembered by the system in space and expected to recur when the spread passes this area of cross-line force.

Calibration

Many measures of a quantity can be combined to get a better estimate of that quantity than any one alone. This principle will be applied in the spread control system described here. The fact that the spread covers a large horizontal space and can be equipped with measuring devices through its vertical extent is an opportunity to measure quantities relevant to spread control over significant portions of time and space. In addition, the error states of a measuring device can be estimated based on additional measurements from other independent sources.

Current Meter Sources of Error

Calibration of measures that contribute to current speed and direction will be conducted in real time. Hull mounted current meters often give inaccurate measures of current depending on their location in relation to the propeller wash and other interference. Further, they report current at the depth they are located and this current may not apply to either the surface or streamer depth.

Current Meter Calibration with a Least Squares Fitting Model

As described previously, the resultant direction of the current on the towed source array can be measured by the response of in-sea equipment. Data from current meter devices located at the depth of this in-sea equipment can be compared to force model-computed values, found through the feather angles computed based on coordinate estimates, and. T, the difference between the observed current meter readings and computed current can be fit to an error model within the transform function.

The best model to use for this relation will depend on the instrument error characteristics and other sources of error present. Although there are nearly an infinite number of mathematical functions that might be best, we can use a simple linear model as an example.

The line model has a constant component that is analogous to a bias and a scale component that can describe a change with respect to some variable like current magnitude or in-sea equipment response time. Residuals in computed and measured current are fit to the line model.

Measures of current that affect surface devices such as the vessel, source arrays, SFEDs, and tailbuoys can be combined to get the best estimate of surface current. Besides current meters, the vessel heading and source arrays, corrected for winds and waves in a force model, can give information about surface currents. Trends in cross-line motion not explained by either vessel motion or device steering can also be used as measures of cross-line current on the surface.

At streamer depth, current measuring devices along the streamer give an indication of the current there. In straight non-assisted towing, as the spread passes through a zone of current, each streamer mounted current meter should give the same measure of current at any given point along its trajectory as the meter that preceded it except for any time varying changes occurring between subsequent passage. Again, fitting a function to describe a trend of change, (time varying assuming the current spatial extent is larger than the horizontal and vertical deviation of subsequent streamer mounted devices), will show a bias caused by any one current meter, compared to all others. In cases where current spatial extent is less than the spread size, local current trends can be estimated.

Cross-Line Speed Calibration

In real time, the cross-line response of steering devices can be estimated. Time taken to reach the target feather given a feather change command reveals the response time of the individual spread control elements to drive commands in the real time environment they occur. This information will be fed back to the computations of optimum drive commands.

For example, measurement of the cross-line component of vessel speed vs. heading change can be fit to a function that describes the relation. The mathematical description of the small changes expected while steering along a time lapse survey line are likely not complicated due to the small range over which the function is relevant. The sequential estimation formulae can be applied to get an update of steering device response time as frequently as position updates are available.

Tension Calibration

Tension measurements may be calibrated against inline water velocity measurements, which are related. When tension expected from the hydrodynamic drag model disagree with those measured, either the tension measurement or a parameter in the hydrodynamic model are the cause of the predicted residual. Parameters such as water velocity and body drag coefficient, based on the effective surface area of the body being dragged, give the tension expectation. Correcting these to give improved agreement with accurate tension meters will give a better tuned hydrodynamic model.

Steering Body Calibration

The navigation solution contributes to improved hydrodynamic modeling. Knowledge of the orientation of the SSD bodies and the current vector give the force available for steering. Such orientation can be computed based on the navigation solution. With this information, SSD wing angle of attack can be translated to a more accurate force vector giving improved control of the spread, as described in International Patent Application No. WO 00/20895.

Validation

When a set of optimal shot point target coordinates and/or streamer shape changes are estimated, a safety check is made to determine if a collision between spread elements is probable. If the check determines the computed optimization is above the target risk limit, this is reported to the user online. The user is then offered a set of alternative steering constraint choices to change that will give a different outcome to the optimization computation.

After the optimal shot point target coordinates and/or streamer shape changes are deemed acceptable, they are used in the spread model to generate optimal spread control element drive commands. These commands are then simulated within the spread model to give the operating states. These operating states are also checked against limits beyond which failures may occur. If it is determined that any of the limits must be exceeded to realize the optimal shot point target coordinates and/or streamer shape changes desired, the limiting spread control element is constrained and an alternate set of drive commands is computed. The number of alternative that can be tried is dependent of computational speed available within the operating update cycle. In parallel, an alternative set of optimal shot point target coordinates and/or streamer shape changes can be computed that will require less of the offending spread control element to give an acceptable set of drive commands. If no safe set of drive commands is available, the online operator assumes manual control through an intelligent GUI with guidance based on spread element operating state information and spread element motion history and prediction clearly presented.

Spread Control Element Relative Proximity Check.

Position estimate differences larger than defined limits for all separately controlled bodies at all points of the body where there is a position estimate available will result in the calculation of different drive commands. Limits for proximity are based on the quality of the position estimate.

Spread Control Element Relative Velocity Check.

All point-relative velocity estimates for all points on separately controlled spread bodies must be less than the limit. The limit is based on the time to next check and the quality of the velocity estimate. If during the time to next check a collision or near collision will occur, drive commands to avoid collision is required. The limit is a function of the error estimate of the velocity.

Spread Control Element Obstruction Proximity Check.

The distance between the position estimate of any point in the spread relative to all obstructions must be less than some limit. The limit is a function of the quality of the position estimate.

Spread Control Element Obstruction Relative Velocity Check.

Velocity estimates cannot result in a proximity larger than a limit over the time before the next velocity estimate cycle. This limit is a function of velocity estimate quality.

Mechanical Integrity Check.

Among the mechanical integrity checks are: no cable tensions being out of bounds; and no steering device wing angles approaching stall.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method comprising:
    towing a plurality of seismic survey sources and receivers generally behind a vessel having one or more spread control elements;
    estimating one or more positions of the sources based on data received from one or more reference points on a seismic survey spread with respect to the earth; and
    activating a selected portion of the sources when the selected portion is within a vicinity of desired cross line positions of a desired track.

2. The method of claim 1, wherein the number of the selected portion of the sources is less than the total number of sources.

3. The method of claim 1, wherein the receivers are towed in a plurality of linear streamers; and wherein the selected portion of the sources forms at least one linear source array parallel to the streamers.

4. The method of claim 1, further comprising:
    collecting input data from the seismic survey spread having a plurality of spread control elements, a plurality of navigation nodes, and a plurality of sources and receivers;
    estimating positions of the sources and receivers using one or more navigation data, one or more operating states, and one or more environmental data;
    determining optimum tracks for the sources and receivers using the estimated positions and a portion of the input data that includes at least the survey design data; and
    calculating drive commands for at least one of the spread control elements using the determined optimum tracks.

5. The method of claim 1, wherein the at least one of the spread control elements is a spread control element for a vessel or a spread control element for a receiver.

6. A seismic survey apparatus, comprising:
    a vessel;
    a plurality of seismic survey sources and receivers generally towed behind the vessel and having one or more spread control elements;
    a controller coupled to the seismic survey sources, receivers and the spread control elements, wherein the controller is configured to:
        estimate one or more positions of the sources based on data received from one or more reference points on the seismic survey apparatus with respect to the earth; and
        selectively activate a portion of the sources that is closest to a vicinity of desired cross line positions of a desired track.

7. The method of claim 1, wherein the reference points comprise at least two reference points located on opposite corners of the seismic survey spread.

8. The method of claim 1, wherein the reference points comprise at least two reference points, and wherein each reference point is located at a corner of the seismic survey spread.

9. The method of claim 1, wherein estimating the positions of the sources comprises estimating the positions of the acoustic positioning receivers on the sources.

10. The method of claim 1, further comprising steering the selected portion of the sources within a cross line corridor to the vicinity near the desired cross line positions.

11. The method of claim 1, further comprising estimating the positions of the sources based on data received from one or more acoustic positioning devices.

* * * * *